United States Patent
Park et al.

(10) Patent No.: US 11,899,872 B2
(45) Date of Patent: Feb. 13, 2024

(54) DISPLAY APPARATUS

(71) Applicant: Samsung Display Co., Ltd., Yongin-Si (KR)

(72) Inventors: Kwangwoo Park, Yongin-si (KR); Yoonho Kim, Yongin-si (KR); Minjung Ann, Yongin-si (KR); Jinwhan Jung, Yongin-si (KR); Jinho Ju, Yongin-si (KR); Sanghyun Choi, Yongin-si (KR); Yechan Choi, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 9 days.

(21) Appl. No.: 17/678,321

(22) Filed: Feb. 23, 2022

(65) Prior Publication Data
US 2022/0397997 A1 Dec. 15, 2022

(30) Foreign Application Priority Data
Jun. 9, 2021 (KR) .................. 10-2021-0074973

(51) Int. Cl.
*G06F 3/041* (2006.01)
(52) U.S. Cl.
CPC ........ *G06F 3/04164* (2019.05); *G06F 3/0412* (2013.01)
(58) Field of Classification Search
None
See application file for complete search history.

(56) References Cited

U.S. PATENT DOCUMENTS

| | | | |
|---|---|---|---|
| 9,312,319 B2 | 4/2016 | Lee et al. | |
| 10,304,912 B2 | 5/2019 | Kim et al. | |
| 10,439,165 B2 | 10/2019 | Kim et al. | |
| 10,734,595 B2 | 8/2020 | Um et al. | |
| 2015/0092131 A1* | 4/2015 | Lee | G02F 1/1337 438/30 |
| 2018/0101270 A1* | 4/2018 | Cho | G06F 3/0446 |
| 2019/0006442 A1* | 1/2019 | Byun | H10K 59/122 |
| 2020/0185647 A1* | 6/2020 | Lee | H10K 59/122 |
| 2021/0064172 A1* | 3/2021 | Lee | H01L 51/5237 |
| 2021/0119178 A1* | 4/2021 | Song | H10K 50/844 |
| 2021/0200406 A1* | 7/2021 | Lee | G06F 3/0443 |
| 2021/0202812 A1* | 7/2021 | Lee | G06F 3/04164 |
| 2022/0020833 A1* | 1/2022 | Cho | H10K 59/122 |
| 2022/0206620 A1* | 6/2022 | Lee | H01L 27/322 |

FOREIGN PATENT DOCUMENTS

| | | |
|---|---|---|
| KR | 10-2017-0084408 A | 7/2017 |
| KR | 10-2018-0013452 A | 2/2018 |
| KR | 10-1994227 B1 | 9/2019 |
| KR | 10-2020-0076911 A | 6/2020 |

* cited by examiner

*Primary Examiner* — Krishna P Neupane
(74) *Attorney, Agent, or Firm* — Innovation Counsel LLP

(57) ABSTRACT

A display apparatus is disclosed that includes a substrate, a partition wall, and wiring. The substrate includes a display area and a peripheral area. The partition wall is arranged in the peripheral area. The wiring is arranged over the substrate extends from the display area to the peripheral area, and inserted into the partition wall or passes through the partition wall. The wiring includes at least one through hole.

25 Claims, 29 Drawing Sheets

DISPLAY APPARATUS

CROSS-REFERENCE TO RELATED APPLICATION

This application is based on and claims priority under 35 U.S.C. § 119 to Korean Patent Application No. 10-2021-0074973, filed on Jun. 9, 2021, in the Korean Intellectual Property Office, the disclosure of which is incorporated by reference herein in its entirety.

BACKGROUND

1. Field

The present inventive concept relates to an apparatus, and more particularly, to a display apparatus.

2. Description of the Related Art

Mobile electronic apparatuses are used widely. As mobile electronic apparatuses, not only miniaturized electronic apparatuses, such as mobile phones, but also tablets and personal computers (PC) are now widely used and have been for some time.

To support various functions, the mobile electronic apparatuses include a display apparatus to provide a user with visual information, such as an image. Recently, because the parts driving a display apparatus have been miniaturized, the proportion of the display apparatus in an electronic apparatus has gradually increased and a structure that may be bent to form a predetermined angle with respect to a flat state is also under development.

SUMMARY

Generally, a display apparatus may include various wirings. In this case, the wirings may not be arranged in a flat shape and may have a bent shape. Thus, disconnection of the wirings may occur and a malfunction or non-operation of the display apparatus may occur due to the disconnection of the wirings. One or more embodiments include a display apparatus that prevents disconnection of wirings.

Additional aspects will be set forth in part in the description which follows and, in part, will be apparent from the description, or may be learned by practice of the presented embodiments of the disclosure.

According to one or more embodiments, a display apparatus includes a substrate including a display area and a peripheral area, a partition wall arranged in the peripheral area, and a wiring arranged over the substrate, extending from the display area to the peripheral area, and inserted into the partition wall or passing through the partition wall, wherein the wiring includes at least one through hole.

The wiring may include a plurality of through holes, and the plurality of through holes may be spaced apart from each other in one direction.

The at least one through hole may be arranged in the wiring arranged inside the partition wall, when viewed in a plan view.

The wiring may include a plurality of through holes, and the plurality of through holes may be arranged in a serpentine pattern.

The partition wall may include a first layer arranged under the wiring, and a second layer arranged on the wiring.

The partition wall may further include a third layer on the second layer.

The second layer or the third layer may include a black material.

The partition wall may further include a fourth layer on the third layer.

The first layer and the second layer may each include an organic material.

The partition wall may surround an outside of the display area.

According to one or more embodiments, a display apparatus includes a substrate including a display area and a peripheral area, a partition wall arranged in the peripheral area, a wiring arranged over the substrate, extending from the display area to the peripheral area, and inserted into the partition wall or passing through the partition wall, and a touch wiring arranged over the substrate, extending from the display area to the peripheral area, and arranged on the partition wall, wherein the wiring includes at least one through hole.

The wiring may include a plurality of through holes, and the plurality of through holes may be spaced apart from each other in a lengthwise direction of the wiring.

The at least one through hole may be arranged in the wiring arranged inside the partition wall, when viewed in a plan view.

The wiring may include a plurality of through holes, and the plurality of through holes may be arranged in a serpentine pattern.

The partition wall may include a first layer arranged under the wiring, and a second layer arranged on the wiring.

The first layer and the second layer may each include an organic material.

The partition wall may further include a third layer on the second layer.

The second layer or the third layer may include a black material.

The partition wall may surround an outside of the display area.

The display apparatus may further include a terminal portion arranged in the peripheral area and configured to be connected to the wiring and the touch wiring.

The partition wall may be arranged in a region between the terminal portion and the display area.

According to one or more embodiments, a display apparatus includes a substrate including a display area and a peripheral area, a partition wall arranged in the peripheral area, a wiring arranged over the substrate, extending from the display area to the peripheral area, and inserted into the partition wall or passing through the partition wall, and a terminal portion arranged in the peripheral area, arranged apart from the display area, and configured to be connected to the wiring, wherein the partition wall is arranged between the terminal portion and the display area, and the wiring includes at least one through hole.

The at least one through hole may be arranged in the wiring arranged inside the partition wall, when viewed in a plan view.

The wiring may include a plurality of through holes, and the plurality of through holes may be arranged in a serpentine pattern.

The partition wall may surround an outside of the display area.

These and other aspects will become apparent and more readily appreciated from the following description of the embodiments, the accompanying drawings, and claims.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
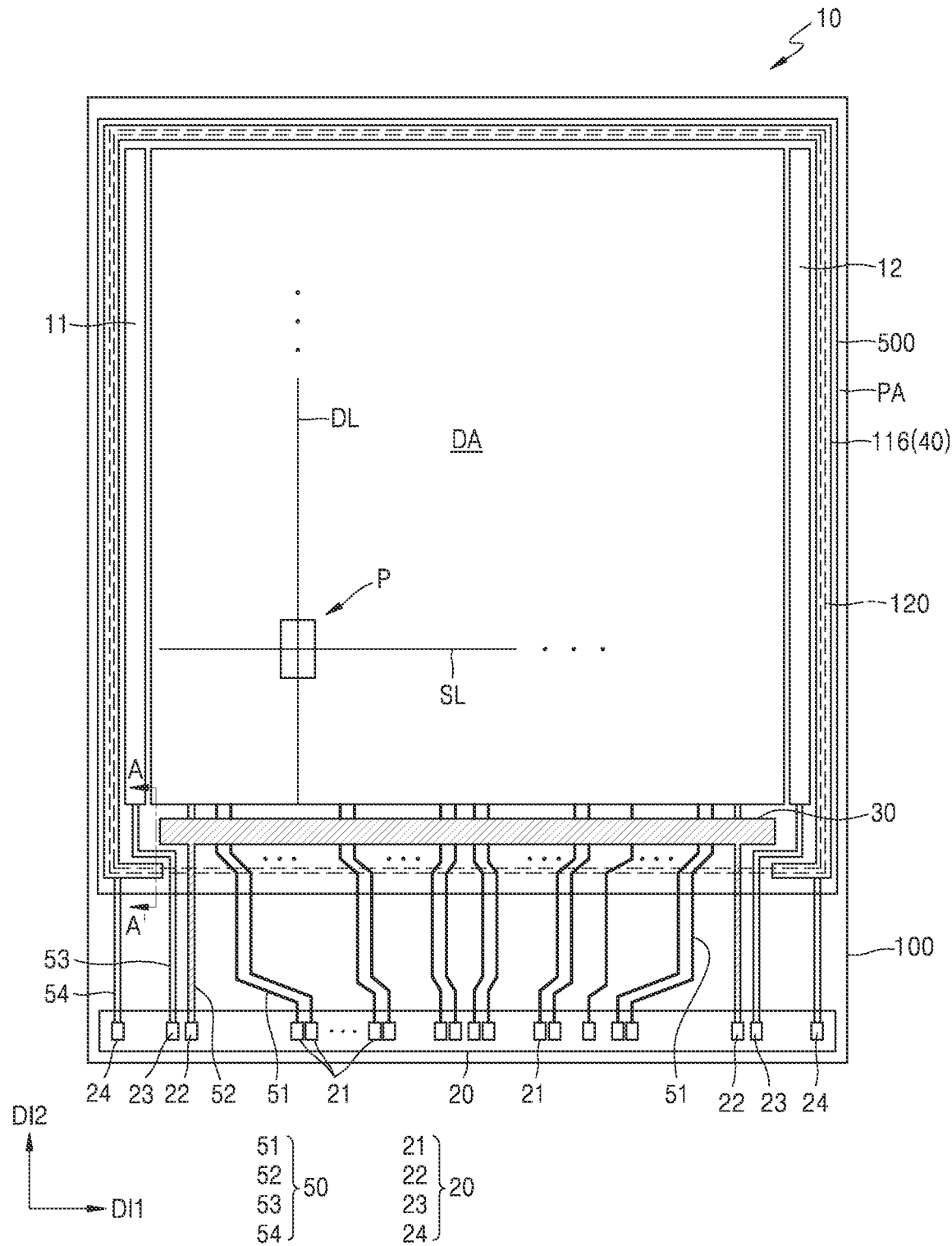
FIG. 1 is a plan view of a display apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

As used herein, the word "or" means logical "or" so that the expression "A, B, or C" means "A and B and C," "A and B but not C," "A and C but not B," "B and C but not A," "A but not B and not C," "B but not A and not C," and "C but not A and not B." Throughout the disclosure, the expression "at least one of a, b or c" indicates only a, only b, only c, both a and b, both a and c, both b and c, all of a, b, and c, or variations thereof.

As the present disclosure allows for various changes and numerous embodiments, certain embodiments will be illustrated in the drawings and described in the written description. Effects and features of the disclosure, and methods for achieving them will be clarified with reference to embodiments described below in detail with reference to the drawings. However, the disclosure is not limited to the following embodiments and may be embodied in various forms.

Hereinafter, embodiments will be described with reference to the accompanying drawings, wherein like reference numerals refer to like elements throughout and a repeated description thereof is omitted.

While such terms as "first" and "second" may be used to describe various components, such components must not be limited to the above terms. The above terms are used to distinguish one component from another.

The singular forms "a," "an," and "the" as used herein are intended to include the plural forms as well unless the context clearly indicates otherwise.

It will be understood that the terms "comprise," "comprising," "include" or "including" as used herein specify the presence of stated features or components but do not preclude the addition of one or more other features or components.

It will be further understood that, when a layer, region, or component is referred to as being "on" another layer, region, or component, it can be directly or indirectly on the other layer, region, or component. That is, for example, intervening layers, regions, or components may be present.

Sizes of elements in the drawings may be exaggerated or reduced for convenience of explanation. For example, since sizes and thicknesses of elements in the drawings are arbitrarily illustrated for convenience of explanation, the disclosure is not limited thereto.

The x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When an embodiment may be implemented differently, a certain process order may be performed differently from the described order. For example, two consecutively described processes may be performed substantially at the same time or performed in an order opposite to the described order.

FIG. 1 is a plan view of a display apparatus 10 according to an embodiment.

Referring to FIG. 1, the display apparatus 10 may include a substrate 100, a display layer (not shown), a thin-film encapsulation layer (not shown), and an input sensing member (not shown), the display layer being arranged in a display area DA, the thin-film encapsulation layer being on the display layer, and the input sensing member being on the thin-film encapsulation layer. In addition, the display apparatus 10 may include a circuit configured to supply power to the display layer or apply signals to the display layer in addition to the above elements.

The substrate 100 may include an organic material or an inorganic material. In an embodiment, the substrate 100 may include a material including silicon (Si), for example, a glass substrate including $SiO_2$ as a main component. In another embodiment, the substrate 100 may include a transparent plastic material. Hereinafter, for convenience of description, the case where the substrate 100 includes a transparent plastic material is mainly described in detail. The substrate 100 may include the display area DA and a peripheral area PA outside the display area DA.

The display area DA is a region in which pixels P are arranged. The display area DA may be configured to display images by using light emitted from the pixels P. The pixel P may be connected to signal lines such as a scan line SL and a data line DL, the scan line SL extending in a DI1 direction, and the data line DL extending in a DI2 direction. Though not shown in FIG. 1, the pixel P may be connected to power lines configured to transfer direct current signals such as a driving power line, a common power line and the like. In this case, though not shown in the drawing, the pixel P may be provided in plurality. In this case, some of the plurality of pixels P may emit light of a first color, others of the plurality of pixels P may emit light of a second color, and the rest of the plurality of pixels P may emit light of a third color.

The pixel P may include a pixel circuit and a display element, the pixel circuit being electrically connected to the above signal lines and power line, and the display element being connected to the pixel circuit and including, for example, an organic light-emitting diode OLED). The pixel P may emit light having, for example, a red, green, blue, or white color through the organic light-emitting diode OLED. In this case, a first color may be one of red, green, and blue colors, a second color may be another of the red, green, and blue colors, and a third color may be still another of the red, green, and blue colors. In another embodiment, all of the first color, the second color, and the third color may be white colors.

The peripheral area PA may include a first scan driver 11, a second scan driver 12, a terminal portion 20, a driving voltage supply line 30, a common voltage supply line 40, and a wiring layer 50.

The first scan driver 11 and the second scan driver 12 may be arranged in the peripheral area PA. The first scan driver 11 and the second scan driver 12 may be apart from each other with the display area DA therebetween. The first scan driver 11 or the second scan driver 12 may be configured to generate and transfer a scan signal to each pixel P through the scan line SL. Though it is shown in FIG. 1 that two scan drivers are arranged, the embodiment is not limited thereto. In another embodiment, one scan driver may be arranged on one side of the display area DA.

The terminal portion 20 may be arranged on one side of the peripheral area PA and may include terminals 21, 22, 23, and 24. The terminal portion 20 may be connected to a driver integrated circuit (IC) by being exposed without being covered by an insulating layer. The driver IC may include a data driver.

The driving voltage supply line 30 may provide a driving voltage to the pixels P. The driving voltage supply line 30 may be arranged in the peripheral area PA to be adjacent to one side of the display area DA.

The common voltage supply line 40 may provide a common voltage to the pixels P. The common voltage is a voltage applied to a cathode electrode of an organic light-emitting diode. The common voltage supply line 40 may be arranged in the peripheral area PA to partially surround the display area DA. In this case, a partition wall 120 may be arranged between the common voltage supply line 40 and the display area DA. In another embodiment, the partition wall 120 may overlap the common voltage supply line 40 in a plan view. In this case, the common voltage supply line 40 may include a first common voltage supply line 116 and a second common voltage supply line 210 described below.

The common voltage supply line 40 may overlap at least a portion of the partition wall 120 in a plan view. In this case, all of the common voltage supply line 40 may overlap at least a portion of the partition wall 120, or a portion of the common voltage supply line 40 may overlap at least a portion of the partition wall 120.

The wiring layer 50 may include a first wiring 51, a second wiring 52, a third wiring 53, and a fourth wiring 54. The first wiring 51, the second wiring 52, the third wiring 53, and the fourth wiring 54 may be arranged between one end portion of the display area DA and the terminal portion 20 and may extend in a DI2-direction. The first wiring 51 electrically connects the signal line in the display area DA to the terminal portion 20. The second wiring 52 electrically connects the driving voltage supply line 30 to the terminal portion 20. The third wiring 53 electrically connects each of the first scan driver 11 and the second scan driver 12 to the terminal portion 20. The fourth wiring 54 electrically connects the common voltage supply line 40 to the terminal portion 20.

Though it is shown in FIG. 1 that the terminals 21, 22, 23, and 24 of the terminal portion 20 are described using reference numerals different from those of the first wiring 51, the second wiring 52, the third wiring 53, and the fourth wiring 54, it may be understood that the terminals 21, 22, 23, and 24 are respectively portions of the first wiring 51, the second wiring 52, the third wiring 53, and the fourth wiring 54. That is, an end portion of the first wiring 51 may correspond to the terminal 21, an end portion of the second wiring 52 may correspond to the terminal 22, an end portion of the third wiring 53 may correspond to the terminal 23, and an end portion of the fourth wiring 54 may correspond to the terminal 24.

Figure 2:
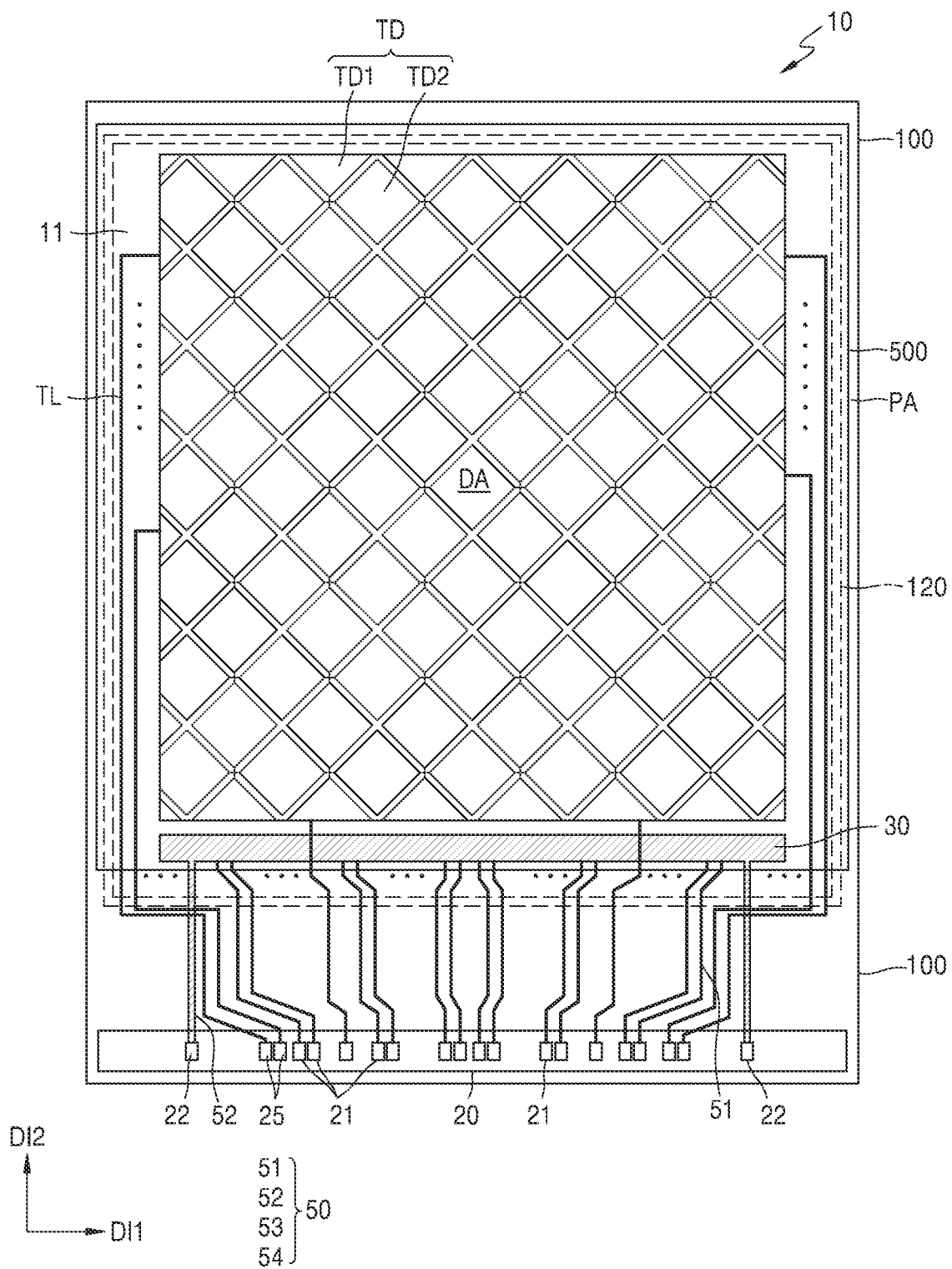
FIG. 2 is a plan view of a display apparatus according to an embodiment.

FIG. 2 is a plan view of the display apparatus 10 according to an embodiment.

Referring to FIG. 2, a plurality of organic light-emitting diodes described below may be arranged over the substrate 100. The organic light-emitting diodes may be shielded by a thin-film encapsulation layer 500. The thin-film encapsulation layer 500 may include at least one organic encapsulation layer and at least one inorganic encapsulation layer. The at least one organic encapsulation layer and the at least one inorganic encapsulation layer may be alternately stacked. The input sensing member may be arranged on the thin-film encapsulation layer 500. The display apparatus 10 may further include an optical functional member arranged on the input sensing member or between the input sensing member and the thin-film encapsulation layer 500.

The input sensing member includes a touch electrode TD of various patterns for a touchscreen function. The touch electrode TD includes first touch electrodes TD1 and second touch electrodes TD2, the first touch electrodes TD1 being connected to each other in a first direction (an DI1-direction, and the second touch electrodes TD2 being connected to each other in a second direction (a DI2-direction) crossing the first direction.

The touch electrode TD may include a transparent electrode material such that light from emission areas of the pixels arranged below the input sensing member passes through the touch electrode TD. Alternatively, the touch electrode TD may be provided in a mesh shape such that light from the emission areas of the pixels pass through the touch electrode TD. In this case, the touch electrode TD is not limited to a transparent electrode material. As an example, the touch electrode TD may include a single layer or a multi-layer including a conductive material including aluminum (Al), copper (Cu), or titanium (Ti).

The touch electrode TD may be connected to a touch line TL configured to transfer a signal sensed by the touch electrode TD. The touch line TL may extend from above the thin-film encapsulation layer 500 to the peripheral area PA along one side of the thin-film encapsulation layer 500.

The touch line TL may be connected to the touch electrode TD of the input sensing member in the display area DA, may extend from above the thin-film encapsulation layer 500, and be connected to a terminal of the terminal portion (not shown). In this case, the touch line TL may have a straight line shape. In addition, the touch line TL may have various shapes such as a curved shape, a zigzag shape, and the like in addition to the straight line shape. The touch line TL may be connected to a touch terminal 25 of the terminal portion 20 to give and take electric signals to and from the input sensing member.

The touch line TL may be connected to a terminal (not shown) beyond the partition wall 120. In this case, the touch line TL may be disconnected due to the partition wall 120. To prevent this, a hole may be formed in the common voltage supply line 40 passing through the partition wall 120. Description thereof is made below in detail.

A cover member (not shown) may be arranged on the input sensing member. In this case, the cover member may include a synthetic resin including a transparent material, thin class, and the like. In addition, an optical functional member may be arranged between the cover member and the input sensing member. The optical functional member may reduce the reflectivity of light (external light) incident toward the display apparatus 10 from the outside or improve color purity of light emitted from the display apparatus 10.

In an embodiment, the optical functional member may include a retarder and a polarizer. The retarder may include a film-type retarder or a liquid crystal-type retarder. The retarder may include a $\lambda/2$ retarder or a $\lambda/4$ retarder. The polarizer may include a film-type polarizer or a liquid crystal-type polarizer. The film-type polarizer may include a stretchable synthetic resin film, and the liquid crystal-type polarizer may include liquid crystals arranged in a preset configuration.

In another embodiment, the optical functional member may include a black matrix and color filters. The color filters may be arranged by taking into account colors of light emitted respectively from the pixels of the display apparatus 10. Each of the color filters may include red, green, or blue pigment or dye. Alternatively, each of the color filters may further include quantum dots in addition to the pigment or dye. Alternatively, some of the color filters may not include pigment or dye and may include scattering particles such as titanium oxide.

In another embodiment, the optical functional member may include a destructive interference structure. The destructive interference structure may include a first reflection layer and a second reflection layer respectively arranged on different layers. First-reflected light and second-reflected light respectively reflected by the first reflection layer and the second reflection layer may create destructive-interference and thus the reflectivity of external light may be reduced.

Figure 3:
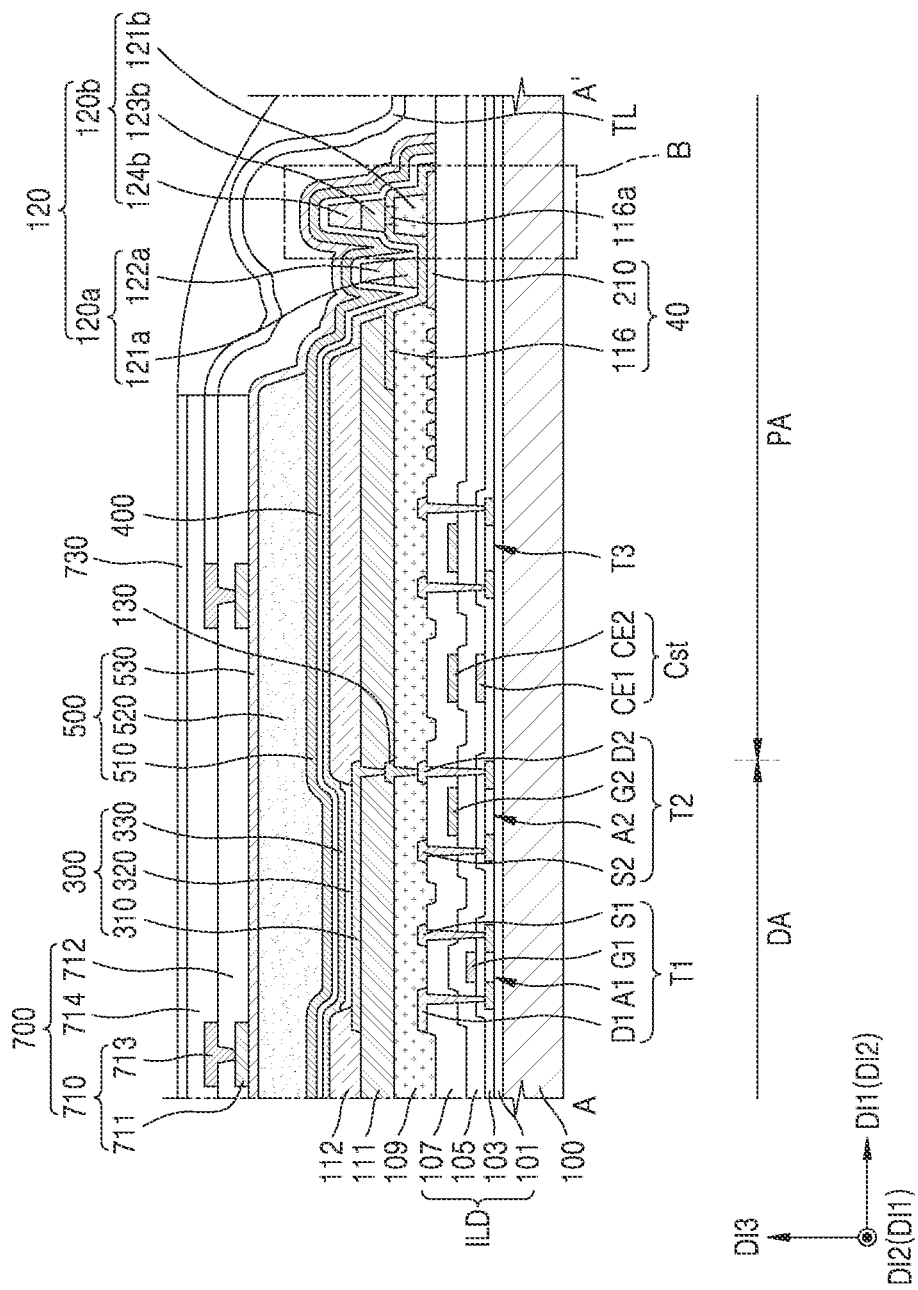
FIG. 3 is a cross-sectional view of a display apparatus according to an embodiment.

FIG. 3 is a cross-sectional view of the display apparatus 10 according to an embodiment.

Referring to FIG. 3, the display apparatus 10 may include the substrate 100, an inorganic insulating layer ILD, organic insulating layers 109, 111, and 112, a thin-film transistor (not shown), an organic light-emitting diode 300, the thin-film encapsulation layer 500, a touchscreen layer 700, and the partition wall 120.

The substrate 100 may include the display area DA and the peripheral area PA outside the display area DA. A plurality of pixels may be arranged in the display area DA of the substrate 100 to display images. Various display elements such as the organic light-emitting diode 300, a thin-film transistor, a capacitor and the like may be arranged in the display area DA. The pixels are formed by electric connection of the organic light-emitting diode 300, the thin-film transistors, the capacitors and the like to display images. A driving current occurs according to a gate signal, a data signal, a driving voltage ELVDD, a common voltage ELVSS and the like supplied to the pixel, the driving current flowing through the display element. The display element may emit light at brightness corresponding to the driving current.

The peripheral area PA may be arranged outside the display area DA. A wiring may be arranged in the peripheral area PA, the wiring being configured to supply various signals or power applied to the display area DA. In this case, the wiring may include a driving circuit. As an example, the driving circuit may include at least one of a scan driving circuit (not shown), a terminal portion (not shown), a driving power supply line (not shown), and the common voltage supply line 40 and further include a thin-film transistor configured to control an electric signal applied into the display area DA. In addition, the partition wall 120 or the trench and the like may be arranged in the peripheral area PA, the partition wall 120 or the trench being configured to prevent flowing of an organic layer used for manufacturing the display apparatus 10. In this case, at least one of the scan driving circuit, the terminal portion, the driving power supply line, the common voltage supply line 40, and a third thin-film transistor T3 may be arranged in one of the peripheral area PA arranged on the long side of the display apparatus 10 and the peripheral area PA arranged on the short side.

The display apparatus 10 may include the substrate 100 and the thin-film encapsulation layer 500, the substrate 100 including the display area DA and the peripheral area PA, and the thin-film encapsulation layer 500 sealing the display area DA.

The substrate 100 may include various materials. As an example, the substrate 100 may include a transparent glass material including $SiO_2$ as a main component. However, the substrate 100 is not limited thereto and may include a transparent plastic material. The plastic material may include an insulating organic material including polyethersulfone (PES), polyacrylate (PAR), polyetherimide (PEI), polyethylene naphthalate (PEN), polyethylene terephthalate (PET), polyphenylene sulfide (PPS), polyarylate, polyimide, polycarbonate (PC), cellulose tri acetate (TAC), and cellulose acetate propionate (CAP). In addition, the substrate 100 may include a multi-layered structure including a layer including the plastic material and a layer including an inorganic layer (not shown).

The buffer layer 101 may be arranged on the substrate 100, may reduce or block the penetration of foreign substance, moisture or external air from below the substrate 100, and provide a flat surface on the substrate 100. The buffer layer 101 may include an inorganic material such as oxide or nitride, an organic material, or an organic/inorganic composite material, and include a single layer or a multi-layer including an inorganic material and an organic material.

A first thin-film transistor T1 may include a first semiconductor layer A1, a first gate electrode G1, a first source electrode S1, and a first drain electrode D1. A second thin-film transistor T2 may include a second semiconductor layer A2, a second gate electrode G2, a second source electrode S2, and a second drain electrode D2.

It is shown below that the first and second thin-film transistors T1 and T2 are top-gate type thin-film transistors. However, the embodiment is not limited thereto and various types of thin-film transistors such as a bottom-gate type thin-film transistor may be employed.

In addition, though it is shown below that two first and second thin-film transistors T1 and T2 are provided, the embodiment is not limited thereto. In embodiments, the display apparatus 10 may employ two or more first and second thin-film transistors T1 and T2 for one pixel. In an embodiment, six to seven first and second thin-film transistors T1 and T2 may be employed for one pixel. However, various changes may be made.

The first and second semiconductor layers A1 and A2 may include amorphous silicon or polycrystalline silicon. In another embodiment, the first and second semiconductor layers A1 and A2 may include an oxide of at least one of indium (In), gallium (Ga), stannum (Sn), zirconium (Zr), vanadium (V), hafnium (Hf), cadmium (Cd), germanium (Ge), chromium (Cr), titanium (Ti), and zinc (Zn). The first and second semiconductor layers A1 and A2 may include a channel region, a source region, and a drain region, the source region and the drain region having carrier concentration higher than the carrier concentration of the channel region.

The first gate electrode G1 is arranged above the first semiconductor layer A1 with a first gate insulating layer 103 therebetween. The first gate electrode G1 may include a single layer or a multi-layer including at least one of molybdenum (Mo), aluminum (Al), copper (Cu), and titanium (Ti). As an example, the first gate electrode G1 may be a single Mo layer.

The inorganic insulating layer ILD may include at least one of the buffer layer 101, the first gate insulating layer 103, a second gate insulating layer 105, and an interlayer insulating layer 107.

The first gate insulating layer 103 is configured to insulate the first semiconductor layer A1 from the first gate electrode G1 and may include silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_2$).

The second gate electrode G2 is arranged over the second semiconductor layer A2 with the first gate insulating layer 103 and the second gate insulating layer 105 therebetween. The second gate electrode G2 may include a conductive material including molybdenum (Mo), aluminum (Al), copper (Cu), and titanium (Ti) and include a single layer or a multi-layer including the above materials. As an example, the second gate electrode G2 may be a single Mo layer or a multi-layer having a structure of Mo/Al/Mo.

The second gate insulating layer 105 may include an inorganic material including oxide or nitride. As an example, the second gate insulating layer 105 may include the same material as that of the first gate insulating layer 103.

The first and second source electrodes S1 and S2 and the first and second drain electrodes D1 and D2 are arranged on the interlayer insulating layer 107. The first and second source electrodes S1 and S2 and the first and second drain electrodes D1 and D2 may include a conductive material including molybdenum (Mo), aluminum (Al), copper (Cu), and titanium (Ti) and include a single layer or a multi-layer including the above materials. As an example, the first and second source electrodes S1 and S2 and the first and second drain electrodes D1 and D2 may have a multi-layered structure of Ti/Al/Ti.

The interlayer insulating layer 107 may include silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_2$).

As described above, the first gate electrode G1 of the first thin-film transistor T1 and the second gate electrode G2 of the second thin-film transistor T2 may be arranged on different layers. Accordingly, the driving ranges of the first thin-film transistor T1 and the second thin-film transistor T2 may be adjusted different.

A first electrode CE1 of a storage capacitor Cst may be arranged in the same layer as the first gate electrode G1 and may include the same material as that of the first gate electrode G1. A second electrode CE2 of the storage capacitor Cst overlaps the first electrode CE1 with the second gate insulating layer 105 therebetween. The second electrode CE2 may be formed in the same layer as the second gate electrode G2 and may include the same material as that of the second gate electrode G2.

It is shown in FIG. 3 that the storage capacitor Cst does not overlap the first thin-film transistor T1 and the second thin-film transistor T2. However, the embodiment is not limited thereto. As an example, the storage capacitor Cst may overlap the first thin-film transistor T1. In an embodiment, the first electrode CE1 of the storage capacitor Cst may be formed as one body with the first gate electrode G1. That is, the first gate electrode G1 of the first thin-film transistor T1 may serve as the first electrode CE1 of the storage capacitor Cst.

Planarization layers 109 and 111 may be arranged on the first and second source electrodes S1 and S2 and the first and second drain electrodes D1 and D2. An organic light-emitting diode OLED may be arranged on the planarization layers 109 and 111. The planarization layers 109 and 111 may include a single layer or a multi-layer including an organic material. The organic material may include a general-purpose polymer such as polymethylmethacrylate (PMMA) or polystyrene (PS), polymer derivatives having a phenol-based group, an acryl-based polymer, an imide-based polymer, an aryl ether-based polymer, an amide-based polymer, a fluorine-based polymer, a p-xylene-based polymer, a vinyl alcohol-based polymer, or a blend thereof. In addition, the planarization layers 109 and 111 may include a composite stack body of an inorganic insulating layer and an organic insulating layer. Hereinafter, for convenience of description, the case where the planarization layers 109 and 111 include a first planarization layer 109 and a second planarization layer 111 is mainly described in detail.

The organic light-emitting diode 300 may be arranged on the second planarization layer 111 inside the display area DA of the substrate 100. The organic light-emitting diode 300 may include a pixel electrode 310, an opposite electrode 330, and an intermediate layer 320 therebetween.

The pixel electrode 310 may be electrically connected to the first thin-film transistor T1 or the second thin-film transistor T2. Hereinafter, for convenience of description, the case where the pixel electrode 310 is electrically connected to the second thin-film transistor T2 is mainly described in detail.

The pixel electrode 310 is electrically connected to the second thin-film transistor T2 by contacting one of the second source electrode S2 and the second drain electrode D2 of the second thin-film transistor T2 through an opening formed in the first and second planarization layers 109 and 111. As an example, the pixel electrode 310 may be electrically connected to the second drain electrode D2 of the second thin-film transistor T2. In this case, in the case where the first and second planarization layers 109 and 111 include a multi-layer as described above, the pixel electrode 310 may be connected to the second drain electrode D2 of the second thin-film transistor T2 through a connection electrode 130. In this case, the connection electrode 130 may be arranged on the first planarization layer 109. The connection electrode 130 may include a conductive material including molybdenum (Mo), aluminum (Al), copper (Cu), and titanium (Ti) and include a single layer or a multi-layer including the above materials. In an embodiment, the contact metal layer CM may include a multi-layer (Ti/Al/Ti) including a titanium layer, an aluminum layer, and a titanium layer that are sequentially stacked. In an embodiment, in the case where the first and second planarization layers 109 and 111 include a single layer, a contact metal layer CM may be omitted.

A pixel electrode 310 may be a reflective electrode. As an example, the pixel electrode 310 may include a reflective layer and a transparent or semi-transparent electrode layer on the reflective layer, the reflective layer including silver (Ag), magnesium (Mg), aluminum (Al), platinum (Pt), palladium (Pd), gold (Au), nickel (Ni), neodymium (Nd), iridium (Ir), chrome (Cr), or a compound thereof. The transparent or semi-transparent electrode layer may include at least one of indium tin oxide (ITO), indium zinc oxide (IZO), zinc oxide (ZnO), indium oxide ($In_2O_3$), indium gallium oxide (IGO), and aluminum zinc oxide (AZO).

A pixel-defining layer 112 may be arranged on the second planarization layer 111. The pixel-defining layer 112 defines a pixel by including an opening that corresponds to each sub-pixel, that is, an opening that exposes at least the central portion of the pixel electrode 310. In addition, the pixel-defining layer 112 may prevent an arc and the like from occurring at the edges of the pixel electrode 310 by increasing a distance between the edges of the pixel electrode 310 and the opposite electrode 330 over the pixel electrode 310. The pixel-defining layer 112 may include an organic material such as polyimide or hexamethyldisiloxane (HMDSO). In another embodiment, the pixel-defining layer 112 may include black dye (for example, ink carbon black and the like) besides an organic material such as polyimide or HMDSO and the like. In this case, the pixel-defining layer 112 may not be transparent. In the case where the pixel-defining layer 112 includes black dye, the optical functional member may not include a phase retarder or a polarizer. Hereinafter, for convenience of description, the case where the pixel-defining layer 112 includes an organic material such as polyimide or HMDSO and the like is mainly described in detail.

The intermediate layer 320 of the organic light-emitting diode may include a low-molecular weight material or a polymer material. In the case where the intermediate layer 320 includes a low molecular weight material, the intermediate layer 320 may have a structure in which a hole injection layer (HIL), a hole transport layer (HTL), an emission layer (EML), an electron transport layer (ETL), an electron injection layer (EIL), etc. are stacked in a single or composite configuration. The intermediate layer 320 may include various organic materials such as copper phthalocyanine (CuPc), N, N'-Di (naphthalene-1-yl)-N, N'-diphenyl-benzidine (NPB), and tris-8-hydroxyquinoline aluminum (Alq3). These layers may be formed by vacuum deposition.

In the case where the intermediate layer 320 includes a polymer material, the intermediate layer 320 may generally include a hole transport layer (HTL) and an emission layer (EML). In this case, the HTL may include poly (3, 4-ethylenedioxythiophene) (PEDOT), and the EML may include a polymer material such as a polyphenylene vinylene (PPV)-based material and a polyfluorene-based material. The intermediate layer 320 may be formed through screen printing, inkjet printing, laser induced thermal imaging (LITI), vacuum deposition that uses a mask, and the like.

The intermediate layer 320 is not limited thereto and may have various structures. In addition, the intermediate layer 320 may include a layer that is one body over a plurality of pixel electrodes 310 or include a layer patterned to correspond to each of the plurality of pixel electrodes 310.

The opposite electrode 330 may be arranged in the display area DA. In an embodiment, the opposite electrode 330 may be arranged to cover the display area DA. That is, the opposite electrode 330 may be arranged as one body over a plurality of organic light-emitting diodes to correspond to the plurality of pixel electrodes 310. In this case, the opposite electrode 330 may be arranged to cover the display area DA and a portion of the peripheral area PA. Hereinafter, for convenience of description, the case where the opposite electrode 330 is arranged to cover the display area DA and a portion of the peripheral area PA is mainly described in detail.

The opposite electrode 330 may be a light-transmissive electrode. As an example, the opposite electrode 330 may be a transparent or semi-transparent electrode and include a metal thin film including Li, Ca, LiF/Ca, LiF/Al, Al, Ag, Mg, and a compound thereof and having a small work function. In addition, a transparent conductive oxide (TCO) layer may be further arranged on the metal thin film, the TCO layer including ITO, IZO, ZnO, or $In_2O_3$.

Because the pixel electrode 310 includes a reflective electrode and the opposite electrode 330 includes a light-transmissive electrode, the display apparatus may be a top-emission type display apparatus in which light emitted from the intermediate layer 320 is emitted toward the opposite electrode 330. However, the embodiment is not limited thereto and the display apparatus may be a bottom-emission type display apparatus in which light emitted from the intermediate layer 320 is emitted toward the substrate 100. In this case, the pixel electrode 310 may include a transparent or semi-transparent electrode, and the opposite electrode 330 may include a reflective electrode. In addition, a display panel according to an embodiment may be a dual-emission type display panel in which light is emitted in two directions of a top side and a bottom side.

A capping layer 400 may be arranged on the opposite electrode 330. In this case, the capping layer 400 may directly contact the opposite electrode 330. The capping layer 400 may have a lower refractive index than that of the opposite electrode 330 and have a higher refractive index than that of a first inorganic encapsulation layer 510. The capping layer 400 may improve light efficiency by reducing a ratio in which light generated from the intermediate layer 320 of the organic emission layer is totally reflected and is not emitted to the outside.

The capping layer 400 may include an inorganic material. As an example, the inorganic material may include zinc oxide, titanium oxide, zirconium oxide, silicon nitride, niobium oxide, tantalum oxide, tin oxide, nickel oxide, indium nitride, and gallium nitride.

The refractive index of the capping layer 400 may be greater than that of the first inorganic encapsulation layer 510. As an example, the refractive index of the capping layer 400 may be greater by about 0.24 than that of the first inorganic encapsulation layer 510. In this case, in the case where a difference between the refractive index of the capping layer 400 and the refractive index of the first inorganic encapsulation layer 510 is less than 0.24, much total reflection may occur at the interface between the capping layer 400 and the first inorganic encapsulation layer 510, or light corresponding to a resonance frequency of the emission layer does not pass, and thus, brightness may be reduced. In this case, the refractive index of the capping layer 400 may be 1.8 or more. As described above, in the case where the refractive index of the capping layer 400 is less than 1.8, light may be reflected between the first inorganic encapsulation layer 510 and the capping layer 400, and thus, the brightness of the emission layer may be reduced.

In addition, in this case, the thickness of the capping layer 400 may be 1000 Å or less. Specifically, the capping layer 400 may be measured in a Z-axis direction of FIG. 3. In this case, when the thickness of the capping layer 400 exceeds about 1000 Å, much time and energy may be consumed in forming the capping layer 400. Furthermore, when the thickness of the capping layer 400 exceeds about 1000 Å, light emitted from the emission layer may not pass and a wavelength thereof varies, and thus, it may be difficult to display a clear image.

The thin-film encapsulation layer 500 may prevent the penetration of external moisture or oxygen by covering the display area DA and a portion of the peripheral area PA. The thin-film encapsulation layer 500 may include at least one organic encapsulation layer and at least one inorganic encapsulation layer. Though FIG. 3 shows an example in which the thin-film encapsulation layer 500 includes two inorganic encapsulation layers 510 and 530 and one organic encapsulation layer 520, a stacking order and the number of stacking is not limited to the embodiment shown in FIG. 3.

The first inorganic encapsulation layer 510 may cover the opposite electrode 330 and include silicon oxide, silicon nitride, or silicon oxynitride. When needed, other layers such as the capping layer 400 may be arranged between the first inorganic encapsulation layer 510 and the opposite electrode 330. Because the first inorganic encapsulation layer 510 is formed along a structure thereunder, an upper surface thereof is not flat as shown in FIG. 3. The organic encapsulation layer 520 covers the first inorganic encapsulation layer 510. Unlike the first inorganic encapsulation layer 510, the upper surface of the organic encapsulation layer 520 may be made flat. Specifically, the upper surface of a portion of the organic encapsulation layer 520 corresponding to the display area DA may be made approximately flat. The organic encapsulation layer 520 may include at least one of polyethylene terephthalate, polyethylene naphthalate, polycarbonate, polyimide, polyethylene sulfonate, polyoxymethylene, polyarylate, and hexamethyldisiloxane. The second inorganic encapsulation layer 530 may cover the organic encapsulation layer 520 and include silicon oxide, silicon nitride, or silicon oxynitride.

Because the thin-film encapsulation layer 500 includes the first inorganic encapsulation layer 510, the organic encapsulation layer 520, and the second inorganic encapsulation layer 530, even when cracks occur inside the thin-film encapsulation layer 500, the cracks may not be connected between the first inorganic encapsulation layer 510 and the organic encapsulation layer 520 or between the organic encapsulation layer 520 and the second inorganic encapsulation layer 530 through the above multi-layered structure.

With this configuration, forming of a path through which external moisture or oxygen penetrates into the display area DA and the peripheral area PA may be prevented or reduced. Because the second inorganic encapsulation layer 530 contacts the first inorganic encapsulation layer 510 at the edge thereof outside the display area DA, the second inorganic encapsulation layer 530 may prevent the organic encapsulation layer 520 from being exposed to the outside.

In this case, the first inorganic encapsulation layer 510 may directly contact the capping layer 400 on the partition wall 120. Specifically, the capping layer 400, the first inorganic encapsulation layer 510, and the second inorganic encapsulation layer 530 may be sequentially stacked on the partition wall 120.

The common voltage supply line 40 may include the first common voltage supply line 116 and the second common voltage supply line 210. The first common voltage supply line 116 may be formed in the same layer as the connection electrode 130 and, as shown in FIG. 3, be formed on a flat surface of the first planarization layer 109 and the partition wall 120. In this case, the first common voltage supply line 116 may include the same material as that of the connection electrode 130 and be formed simultaneously with the connection electrode 130. In this case, the first common voltage supply line 116 may be connected to the opposite electrode 330. In this case, the first common voltage supply line 116 may be directly connected to the opposite electrode 330 or, though not shown in the drawing, connected to the opposite electrode 330 through a separate common voltage connection line (not shown). Particularly, the common voltage connection line may be formed on a flat surface of the second planarization layer 111, connected to the opposite electrode 330, and may extend to the upper surface of the first common voltage supply line 116 and be connected to the first common voltage supply line 116. Hereinafter, for convenience of description, the case where the first common voltage supply line 116 may be directly connected to the opposite electrode 330 is mainly described in detail.

The first common voltage supply line 116 may stably supply the common voltage ELVSS to the opposite electrode 330 in cooperation with the second common voltage supply line 210 by increasing a contact area with the opposite electrode 330. In this case, at least a portion of the first common voltage supply line 116 may shield a portion or all of the second common voltage supply line 210. Particularly, the first common voltage supply line 116 may be arranged to shield the entire surface of the second common voltage supply line 210 and extend to the upper portion of some of layers of the partition wall 120. In another embodiment, the first common voltage supply line 116 may be arranged to completely shield the upper portion of some of layers of the partition wall 120. Hereinafter, for convenience of description, the case where the first common voltage supply line 116 is arranged to completely shield the upper portion of some of layers of the partition wall 120 is mainly described in detail.

The second common voltage supply line 210 and the partition wall 120 are arranged in the peripheral area PA of the substrate in other cases. The second common voltage supply line 210 may be a line configured to supply power to the display area DA, may include the same material as those of the first and second source electrodes S1 and S2 and the first and second drain electrodes D1 and D2, and be formed in the same layer as the first and second source electrodes S1 and S2 and the first and second drain electrodes D1 and D2. In an embodiment, the second common voltage supply line 210 may be connected to the opposite electrode 330 of the organic light-emitting diode 300 to serve as a line configured to transfer the common voltage ELVSS. In an embodiment, the second common voltage supply line 210 may be directly connected to the opposite electrode 330 through the opposite electrode 330 that extends. In another embodiment, as shown in FIG. 3, the second common voltage supply line 210 may be connected to the opposite electrode 330 through the first common voltage supply line 116. In this case, the first common voltage supply line 116 may include the same material as that of the connection electrode 130 and be formed simultaneously with the connection electrode 130. However, the embodiment is not limited thereto and the second common voltage supply line 210 may be connected to the opposite electrode 330 in various ways. Hereinafter, for convenience of description, the case where the second common voltage supply line 210 is connected to the opposite electrode 330 through the first common voltage supply line 116 is mainly described in detail.

The partition wall 120 may cover at least a portion of the second common voltage supply line 210. In an embodiment, the partition wall 120 may cover an edge region of the second common voltage supply line 210 away from the display area DA and may not cover and edge region of the second common voltage supply line 210 adjacent to the display area DA. However, the partition wall is not limited thereto. The partition wall 120 may cover all of the second common voltage supply line 210. Various modifications may be made.

While the organic encapsulation layer 520 of the thin-film encapsulation layer 500 configured to seal the display area DA and the peripheral area PA is formed, the partition wall 120 may block an organic material of the organic encapsulation layer 520 from flowing in an edge direction and thus prevent an edge tail of the organic encapsulation layer 520 from being formed.

At least one partition wall 120 may be provided. Hereinafter, for convenience of description, the case where two partition walls 120 apart from each other are provided is mainly described in detail.

The partition wall 120 includes a first partition wall 120a and a second partition wall 120b apart from each other. The second common voltage supply line 210 may pass through at least one of the first partition wall 120a and the second partition wall 120b. Hereinafter, for convenience of description, the case where the second common voltage supply line 210 passes through the second partition wall 120b is mainly described.

The first partition wall 120a and the second partition wall 120b may be arranged on the second common voltage supply line 210 in the peripheral area PA. In addition, at least one of the first partition wall 120a and the second partition wall 120b may include a plurality of layers. In this case, at least one of the layers constituting the at least one of the first partition wall 120a and the second partition wall 120b may include an organic material. In FIG. 3, the first partition wall 120a may have a structure in which a first layer 121a and a second layer 122a are stacked, the first layer 121a including the same material as that of the second planarization layer 111, and the second layer 122a including the same material as that of the pixel-defining layer 112. It is shown that the second partition wall 120b has a structure in which a first layer 121b and a second layer 123b, and a third layer 124b are stacked, the first layer 121b including the same material as that of the first planarization layer 109, the second layer 123b including the same material as that of the second planarization layer 111, and the third layer 124b including the same material as that of the pixel-defining layer 112. However, the embodiment is not limited thereto. One of the first partition wall 120a and the second partition wall 120b may include a single layer, both the first partition wall 120a and the second partition wall 120b may include a two-layered structure, or both the first partition wall 120a and the second partition wall 120b may include a three-layered structure. However, various modifications may be made. In addition, an addition partition wall may be further provided, the additional partition wall being apart from the first partition wall 120a and the second partition wall 120b.

Because the partition wall 120 includes a plurality of partition walls, flooding of an organic material may be more effectively prevented while the organic encapsulation layer 520 is formed.

The first common voltage supply line 116 connected to the second common voltage supply line 210 may extend to the upper portion of the first layer 121b of the second partition wall 120b. In this case, the first common voltage supply line 116 may extend between the first layer 121b and the second layer 123b of the second partition wall 120b. In addition, the second common voltage supply line 210 may be arranged below the first partition wall 120a and connected to the first common voltage supply line 116. Accordingly, because a contact area of the first common voltage supply line 116 and the second common voltage supply line 210 increases, a contact resistance between the first common voltage supply line 116 and the second common voltage supply line 210 may be reduced.

The first common voltage supply line 116 may include a first through hole 116a. In a plan view, the first through hole 116a may be formed in the first common voltage supply line 116 overlapping the partition wall 120. In this case, the range of the first common voltage supply line 116 overlapping the partition wall 120 may denote an entire region in which the partition wall 120 is formed. As an example, the range of the first common voltage supply line 116 overlapping the partition wall 120 may be from the end of the first partition wall 120a to the end of the second partition wall 120b and may include a space between the first partition wall 120a and the second partition wall 120b. In another embodiment, the range of the first common voltage supply line 116 overlapping the partition wall 120 may denote the first common voltage supply line 116 overlapping the partition wall 120 in a plan view. As an example, the range of the first common voltage supply line 116 overlapping the partition wall 120 may denote only at least one of the lower portion of the first partition wall 120a and the lower portion of the second partition wall 120b in FIG. 3. In this case, in FIG. 3, the space between the first partition wall 120a and the second partition wall 120b may be excluded. In another embodiment, the range of the first common voltage supply line 116 overlapping the partition wall 120 may denote a portion of the first common voltage supply line 116 overlapping the partition wall 120 in an intermediate portion of which the first common voltage supply line 116 is inserted among the partition wall 120. As an example, in FIG. 3, because the first common voltage supply line 116 is arranged below the first partition wall 120a and inserted into the second partition wall 120b, the first through hole 116a may be formed in only a portion of the first common voltage supply line 116 overlapping the second partition wall 120b. Hereinafter, for convenience of description, the case where the first through hole 116a is formed in the portion of the first common voltage supply line 116 that is inserted into the second partition wall 120b as shown in FIG. 3 is mainly described in detail.

At least one first through hole 116a may be provided. Particularly, in the case where the first through hole 116a is provided in a plurality, the first through holes 116a may be arranged in various directions. As an example, in an embodiment, the plurality of first through holes 116a may be apart from each other in a direction (e.g., a DI1-axis direction or a DI2-axis direction in FIG. 2) in which the partition wall 120 is formed. As an example, in the case of the first common voltage supply line 116 arranged on the lateral surface of the display area DA, the first through holes 116a may be apart from each other in the DI2-axis direction in FIG. 2. In another embodiment, in FIG. 2, the first through holes 116a of the portion of the first common voltage supply line 116 overlapping the partition wall 120 in a plan view in the display area DA may be apart from each other in the DI1-axis direction of FIG. 2. In addition, in another embodiment, the plurality of first through holes 116a may be arranged in a direction between the DI1-axis and the DI2-axis of FIG. 2. In another embodiment, the plurality of first through holes 116a may be arranged in a curve shape or a zigzag shape. Hereinafter, for convenience of description, the case where the first through holes 116a are apart from each other in the direction in which the partition wall 120 is formed is mainly described in detail.

In this case, the first through holes 116a may be arranged in a portion of the first common voltage supply line 116 overlapping the partition wall 120 in a plan view. In this case, the first through holes 116a may be formed in various shapes and may have various shapes.

The first through holes 116a may be arranged in the first common voltage supply line 116 entirely or arranged in a portion of the first common voltage supply line 116. Particularly, the first through holes 116a may be arranged in a portion of the first common voltage supply line 116 overlapping the second partition wall 120b.

The touchscreen layer 700 may have a structure in which a first touch conductive layer 711, a first insulating layer 712, a second touch conductive layer 713, and a second insulating layer 714 are sequentially stacked. A touch electrode 710 may include a first touch conductive layer 711 and a second touch conductive layer 713. In this case, the touch electrode 710 may correspond to the touch electrode TD described with reference to FIG. 2.

In an embodiment, the second touch conductive layer 713 may serve as a sensor portion that senses whether a touch is made, and the first touch conductive layer 711 may serve as a connector that connects the second touch conductive layers 713 in one direction, the second touch conductive layers 713 being patterned. As an example, the second touch conductive layer 713 may correspond to the first touch electrode TD1 or the second touch electrode TD2 of FIG. 2.

In an embodiment, both the first touch conductive layer 711 and the second touch conductive layer 713 may serve as sensor portions. As an example, the first insulating layer 712 may include a via hole that exposes the upper surface of the first touch conductive layer 711. The first touch conductive layer 711 may be connected to the second touch conductive layer 713. As described above, because the first touch conductive layer 711 and the second touch conductive layer 713 are used, a resistance of the touch electrode 710 may be reduced and a response speed of the touchscreen layer 700 may be improved. In this case, the first touch conductive layer 711 or the second touch conductive layer 713 may correspond to the first touch electrode TD1 or the second touch electrode TD2 shown in FIG. 2.

In an embodiment, the touch electrode 710 may be formed in a mesh structure such that light emitted from the organic light-emitting diode 300 passes through the touch electrode 710. Accordingly, the first touch conductive layer 711 and the second touch conductive layer 713 of the touch electrode 710 may not overlap the emission area (e.g., a region of the pixel electrode 310 that is exposed outside the pixel-defining layer 112) of the organic light-emitting diode 300.

The first touch conductive layer 711 and the second touch conductive layer 713 may each include a single layer or a multi-layer including a conductive material having excellent conductivity. As an example, the first touch conductive layer 711 and the second touch conductive layer 713 may each include a single layer or a multi-layer including a transparent conductive layer and a conductive material including Al, Cu, and Ti. The transparent conductive layer may include a transparent conductive oxide such as indium tin oxide (ITO), indium zinc oxide (IZO), zinc oxide (ZnO), and indium tin zinc oxide (ITZO). In addition, the transparent conductive layer may include at least one of a conductive polymer such as PEDOT, a metal nano wire, and graphene. In an embodiment, the first touch conductive layer 711 and the second touch conductive layer 713 may each have a stack structure of Ti/Al/Ti.

The first insulating layer 712 and the second insulating layer 714 may each include an inorganic material or an organic material. The inorganic material may include at least one of silicon nitride, aluminum nitride, zirconium nitride, titanium nitride, hafnium nitride, tantalum nitride, silicon oxide, aluminum oxide, titanium oxide, tin oxide, cerium oxide, and silicon oxynitride. The organic material may include at least one of an acryl-based resin, a methacryl-based resin, polyisoprene, a vinyl-based resin, an epoxy-based resin, a urethane-based resin, a cellulose-based resin, and a perylene-based resin.

Though not shown, a touch buffer layer may be further arranged between the thin-film encapsulation layer 500 and the touchscreen layer 700. The touch buffer layer may prevent damage to the thin-film encapsulation layer 500 and block interference signals that may occur while the touchscreen layer 700 is driven. The touch buffer layer may include an inorganic material such as silicon oxide, silicon nitride, silicon oxynitride, aluminum oxide, aluminum nitride, titanium oxide, titanium nitride, and the like or an organic material such as polyimide, polyester, acryl, and the like, and include a stack body of the above materials.

Because the touch buffer layer or the touchscreen layer 700 are directly formed on the thin-film encapsulation layer 500 through deposition and the like, a separate adhesive layer is not required on the thin-film encapsulation layer 500. Accordingly, the thickness of the display apparatus may be reduced.

A cover layer 730 is flexible and may include at least one of polymethyl methacrylate, polydimethylsiloxane, polyimide, acrylate, polyethylene terephthalate, and polyethylene naphthalate. The cover layer 730 may be arranged on the touchscreen layer 700 and may protect the touchscreen layer 700. The cover layer 730 may extend to the peripheral area PA. However, the embodiment is not limited thereto. The cover layer 730 may be arranged in only the display area DA. Various modifications may be made.

The touch line TL may be connected to one of the first touch conductive layer 711 and the second touch conductive layer 713 and connected to a terminal (not shown). In this case, the touch line TL may be arranged on the second inorganic encapsulation layer 530 and connected to the terminal. In this case, the touch line TL may be arranged on the first partition wall 120a and the second partition wall 120b.

While the touch line TL is arranged on the second partition wall 120b, disconnection of the touch line TL may occur depending on the state of the second partition wall 120b. Particularly, in the second partition wall 120b, the first common voltage supply line 116 passes between one layer and another layer of the second partition wall 120b. While each layer of the second partition wall 120b is formed, each layer may be hardened by applying each to each layer of the second partition wall 120b. In this case, a gas may occur from one layer (e.g., the first layer 121b of the second partition wall 120b) of the second partition wall 120b arranged under the first common voltage supply line 116. Because such a gas is blocked by the first common voltage supply line 116, some layer of the second partition wall 120b arranged under the first common voltage supply line 116 may be swollen. In this case, the entire height of the second partition wall 120b rises. Due to the second partition wall 120b, bending may occur severely near the second partition wall 120b.

In the above case, because the touch line TL is arranged on the second partition wall 120b, due to the above bending, the disconnection of the touch line TL may occur. In this case, because the first through hole 116a of the first common voltage supply line 116 is arranged in the first common voltage supply line 116 overlapping the second partition wall 120b in a plan view, a gas occurring from below the first common voltage supply line 116 may be swiftly discharged while each layer of the second partition wall 120b is formed. That is, in FIG. 3, in the case where at least one of the second layer 123b and the third layer 124b of the second partition wall 120b is formed, a gas occurring from the first layer 121b of the second partition wall 120b may be discharged to the outside through the first through hole 116a. Accordingly, while the second partition wall 120b is formed, a layer arranged under the first common voltage supply line 116 may be prevented from being swollen due to non-discharging of a gas of a layer arranged under the first common voltage supply line 116.

Particularly, in this case, while the touch line TL is formed, the touch line TL may be formed in a shape by taking into account the height, the area, the shape and the like of the second partition wall 120b. In the case where some layer of the partition wall 120 arranged under the first common voltage supply line 116 is swollen as described above, the shape of the first common voltage supply line 116 may be changed into a shape different from a designed shape. As an example, in the case where the height of the second partition wall 120b becomes higher than a designed height, the amount of a material required for forming the first common voltage supply line 116 may increase, or the first common voltage supply line 116 should be formed by supplying the material on the second partition wall 120b for longer time. However, as described above, because it is nearly impossible to change these conditions whenever the first common voltage supply line 116 is formed, the height, the area, the shape and the like of the second partition wall 120b should be maintained same as or similar to designed height, area, shape, and the like. For this purpose, as described above, it is possible to effectively remove a gas occurring from the layer arranged under the first common voltage supply line 116 by forming the first through hole 116a in the first common voltage supply line 116.

FIGS. 4A to 4F are plan views showing embodiments of the first common voltage supply line 116, the second partition wall 120b, and the through holes 116a shown in FIG. 3.

Referring to FIGS. 4A to 4F, the second partition wall 120b may be arranged on the inorganic insulating layer ILD shown in FIG. 3. The first common voltage supply line 116 may overlap the second partition wall 120b in a plan view. As an example, the first common voltage supply line 116 may pass through the lower portion of the second partition wall 120b or be arranged on at least some of layers of the second partition wall 120b to pass through the second partition wall 120b. As an example, the second partition wall 120b may be formed in the DI1-direction or the DI2-direction of FIG. 1 and may surround the display area DA.

The touch line TL may form a preset angle with respect to a direction in which the second partition wall 120b extends or a direction in which at least a portion of the first common voltage supply line 116 extends. As an example, the second partition wall 120b and the first common voltage supply line 116 may extend in one of the DI1-direction and the DI2-direction. In this case, the touch line TL may extend in the other of the DI1-direction and the DI2-direction, which is a direction perpendicular to the direction in which at least one of the second partition wall 120b and the first common voltage supply line 116 extends. That is, in FIGS. 4A to 4F, in the case where at least one of the second partition wall 120b and the first common voltage supply line 116 extends in the DI1-direction, the touch line TL may extend in the DI2-direction. In the case where at least one of the second partition wall 120b and the first common voltage supply line 116 extends in the DI2-direction, the touch line TL may extend in the DI1-direction.

In this case, at least a portion of the partition wall 120 may overlap the first common voltage supply line 116 in a plan view. Hereinafter, for convenience of description, the case where the partition wall 120 is arranged inside the first common voltage supply line 116 is mainly described in detail. As an example, as shown in FIGS. 4A to 4F, the partition wall 120 may be arranged inside the first common voltage supply line 116 in a plan view. In another embodiment, though not shown in the drawing, a portion of the partition wall 120 may overlap the first common voltage supply line 116 in a plan view. In this case, the partition wall 120 may include the first partition wall 120a and the second partition wall 120b. That is, in the case where the partition wall 120 overlaps the first common voltage supply line 116 entirely in a plan view, both the first partition wall 120a and the second partition wall 120b may be arranged inside the first common voltage supply line 116 in a plan view. In contrast, in the case where a portion of the partition wall 120 overlaps the first common voltage supply line 116 in a plan view, only one of the first partition wall 120a and the second partition wall 120b may overlap the first common voltage supply line 116, or a portion of the first partition wall 120a and the second partition wall 120b may overlap the first common voltage supply line 116. In this case, the first partition wall 120a and a portion of the second partition wall 120b may overlap the first common voltage supply line 116, or a portion of the first partition wall 120a may overlap a portion of the second partition wall 120b. Hereinafter, for convenience of description, the case where both the first partition wall 120a and the second partition wall 120b are arranged inside the first common voltage supply line 116 in a plan view is mainly described in detail. Also, for convenience of description, the case where the first through hole 116a is formed in the first common voltage supply line 116 overlapping the second partition wall 120b in a plan view is mainly described in detail.

Figure 4A:
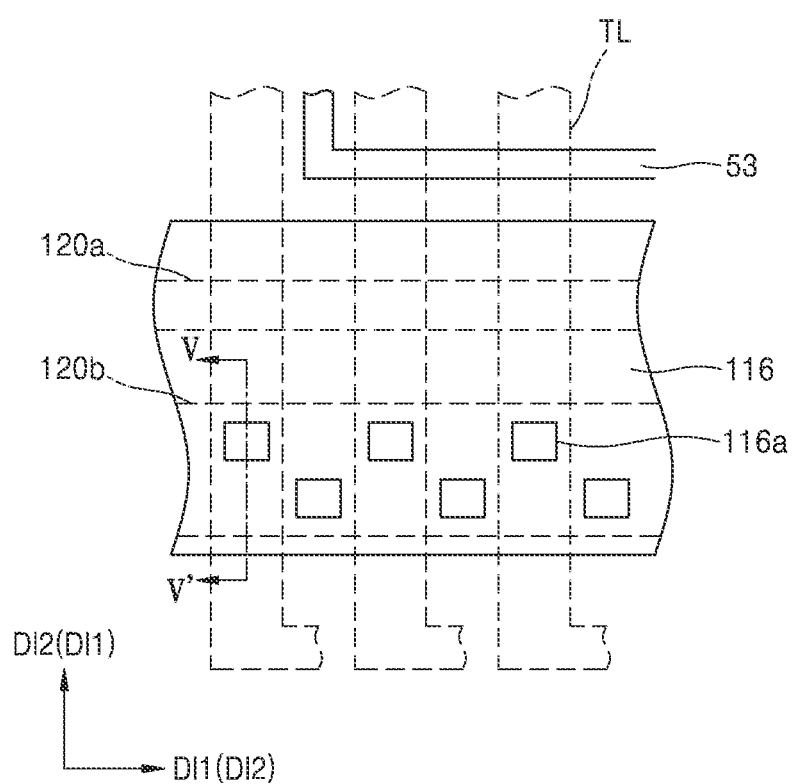
FIGS. 4A, 4B, 4C, 4D, 4E and 4F are plan views showing a relationship between a first common voltage supply line and a second partition wall shown in FIG. 3.

The first through hole 116a may be arranged in the first common voltage supply line 116. In this case, the first through hole 116a may be arranged in various shapes in various methods. As an example, the first through hole 116a may have a square shape as shown in FIG. 4A. In this case, the first through hole 116a may be provided in a plurality and the plurality of first through holes 116a may be apart from each other. The plurality of first through holes 116a may be arranged in a zigzag shape or a serpentine shape.

Figure 4B:
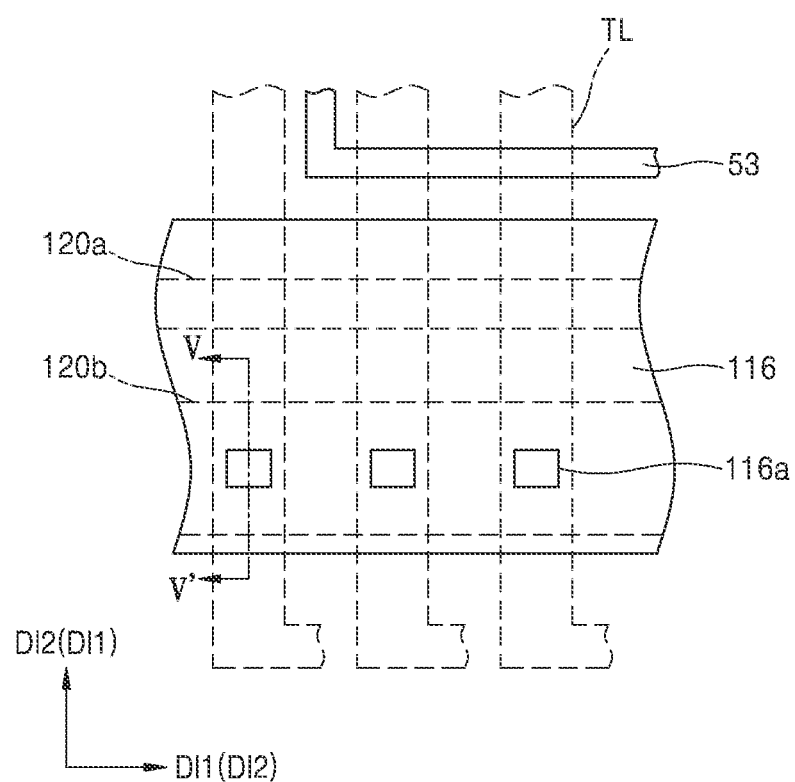

As shown in FIG. 4B, the first through hole 116a may have a square shape. In this case, the first through holes 116a may be arranged in a line or apart from each other in one direction. In another embodiment, as shown in FIG. 4A, the first through holes 116a may be arranged in a zigzag shape or a serpentine shape.

Figure 4C:
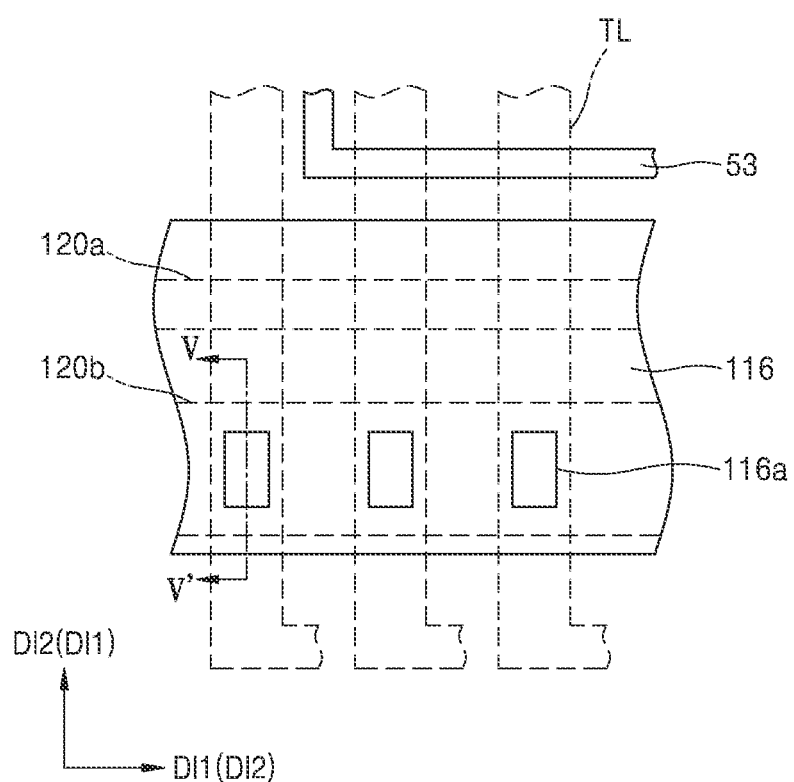

Referring to FIG. 4C, the first through hole 116a may have a rectangular shape formed in a lengthwise direction (e.g., the DI2-axis direction of FIG. 4C) of the touch line TL. In this case, the first through holes 116a may be arranged in a line in one direction (e.g., the DI1-axis direction of FIG. 4C). In another embodiment, as shown in FIG. 4A, the first through holes 116a may be arranged in a zigzag shape or a serpentine shape.

Figure 4D:
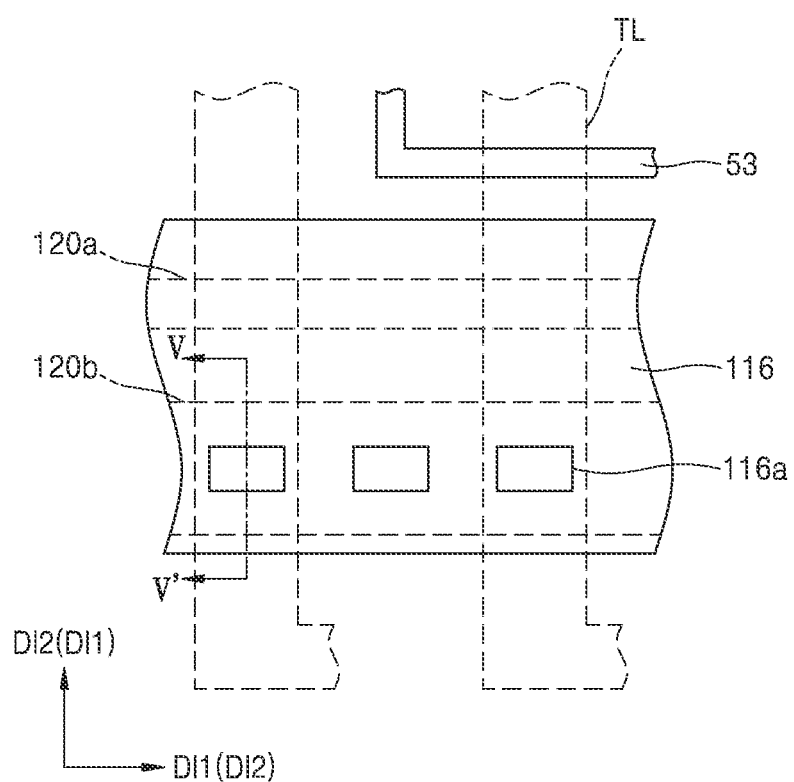

Referring to FIG. 4D, the first through hole 116a may have a rectangular shape. A long side of the first through hole 116a may be arranged in a direction (e.g., the DI1-axis direction of FIG. 4D) perpendicular to the lengthwise direction of the touch line TL. In this case, the plurality of first through holes 116a may be arranged in a line in one direction. In another embodiment, as shown in FIG. 4A, the first through holes 116a may be arranged in a zigzag shape or a serpentine shape.

Figure 4E:
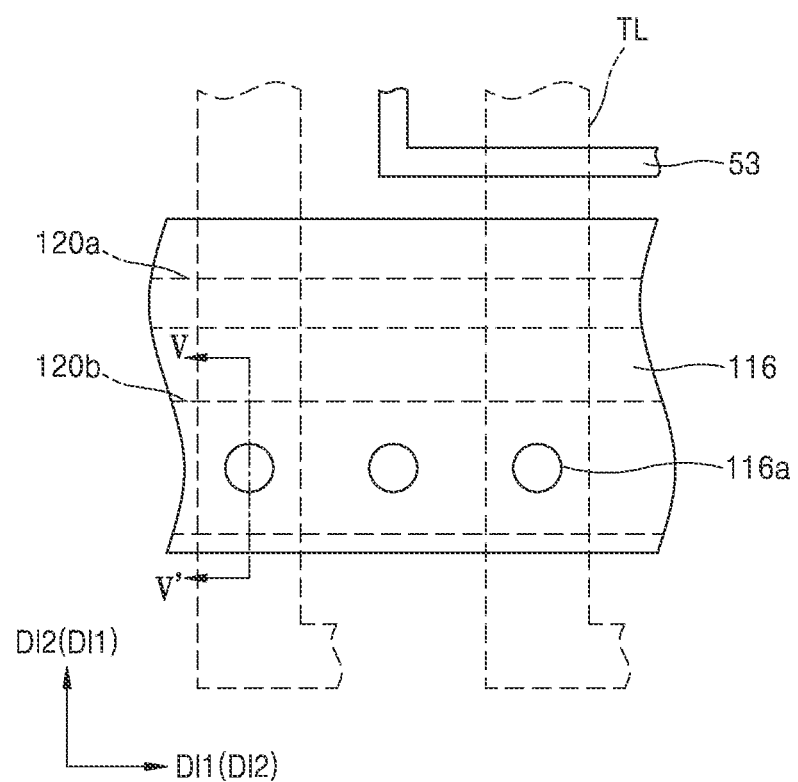

Referring to FIG. 4E, the first through hole 116a may be formed in a circular shape. In this case, the first through hole 116a may be provided in a plurality and the plurality of first through holes 116a may be arranged in a line in one direction. In another embodiment, as shown in FIG. 4A, the first through holes 116a may be arranged in a zigzag shape or a serpentine shape.

Figure 4F:
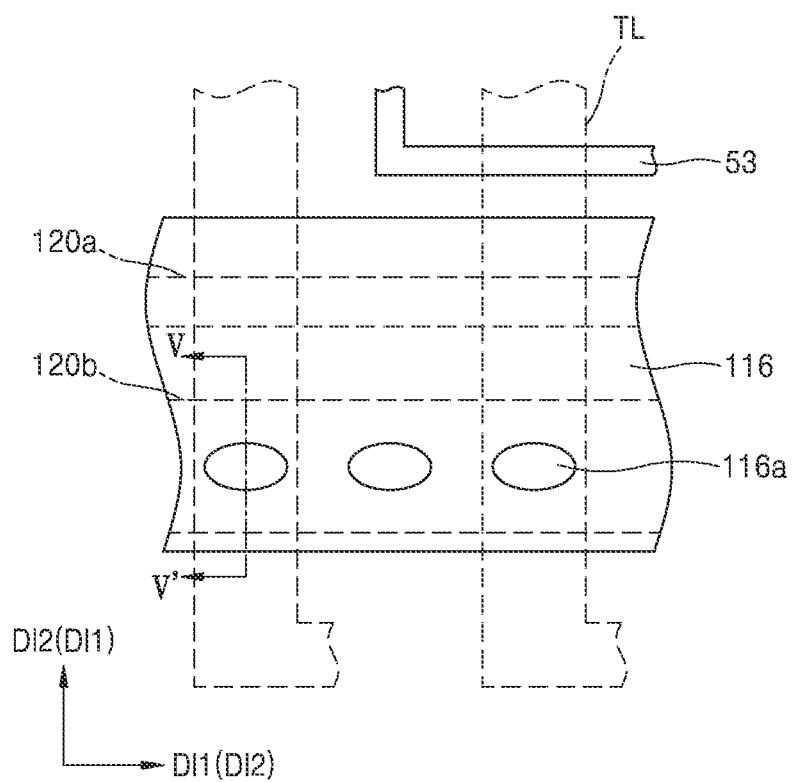

Referring to FIG. 4F, the first through hole 116a may have an elliptical shape. In this case, the first through hole 116a may be provided in a plurality and the plurality of first through holes 116a may be arranged in a line in one direction. In another embodiment, as shown in FIG. 4A, the first through holes 116a may be arranged in a zigzag shape or a serpentine shape.

The first through hole 116a may be formed in various shapes in addition to the above shapes. As an example, the first through hole 116a may have a polygonal shape such as a triangle, a quadrangle, a pentagon, and the like. In another embodiment, the first through hole 116a may have a star shape, an irregular shape, and the like.

The first through hole 116a may be arranged in various shapes in addition to the above configurations. As an example, in the case where the first through hole 116a is provided in a plurality, a shape connecting the centers of the plurality of first through holes 116a may form a polygon, a circular shape, an elliptical shape, a star shape, and the like in addition to a straight line.

Figure 5A:
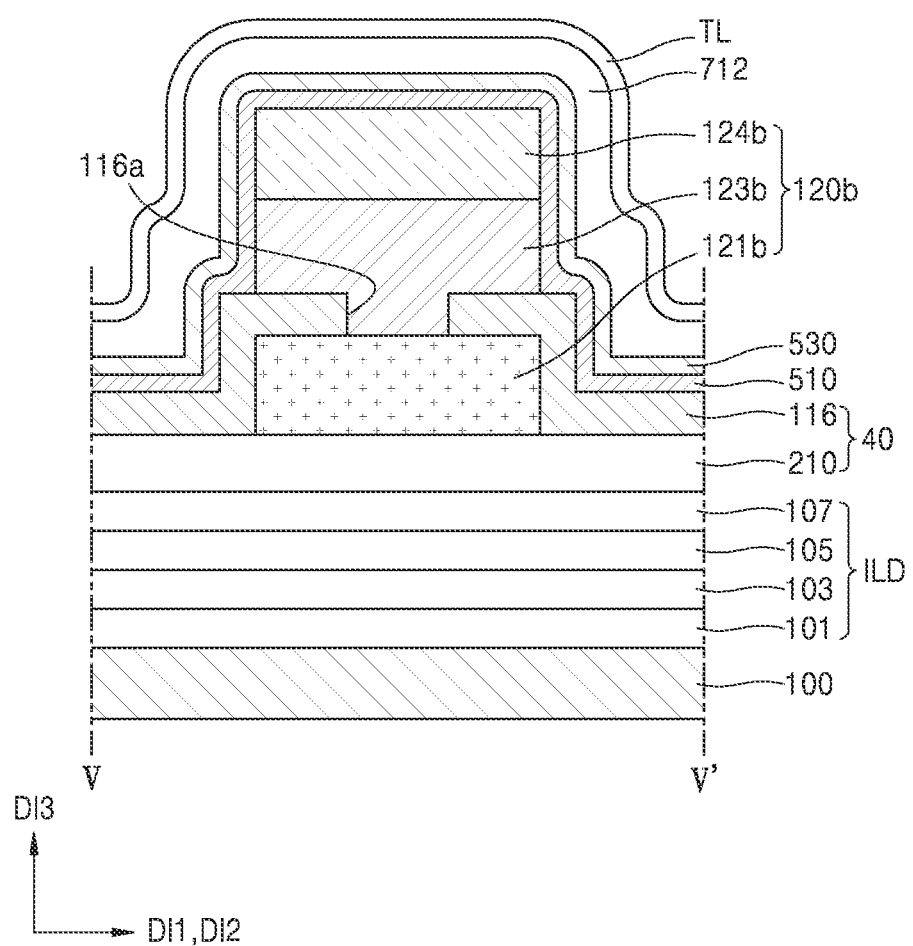
FIGS. 5A, 5B, and 5C are cross-sectional views of a second partition wall and a first common voltage supply line according to an embodiment.
Figure 5B:
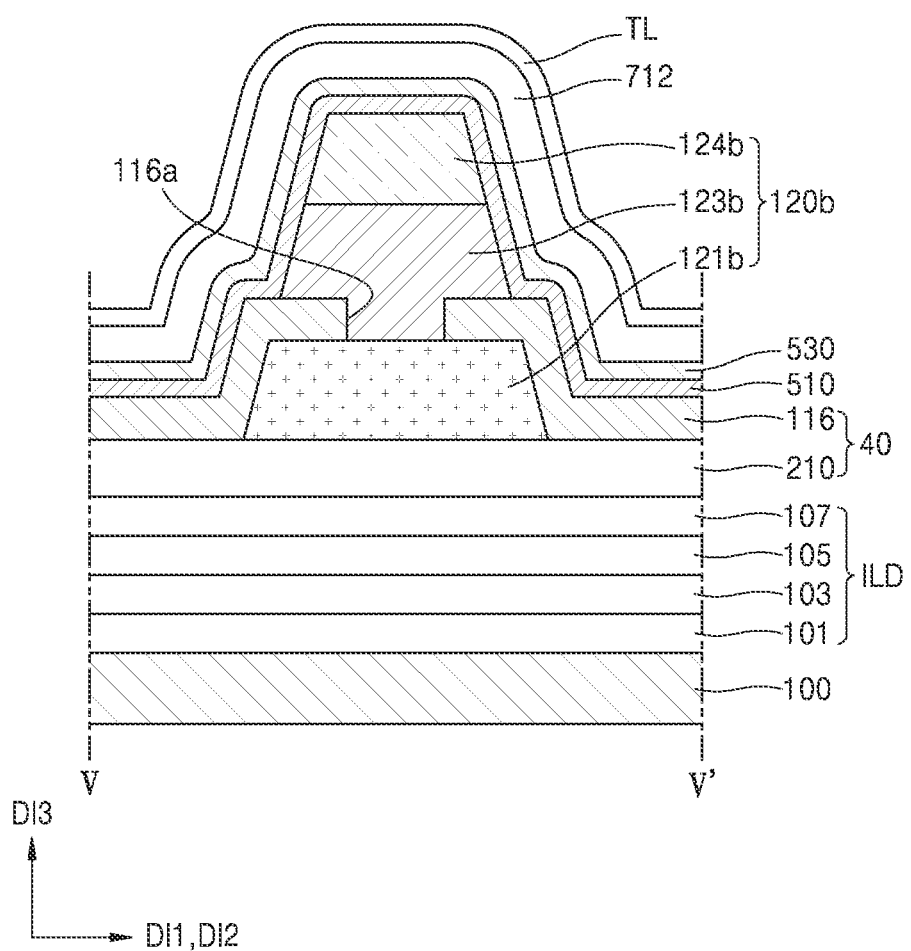
Figure 5C:
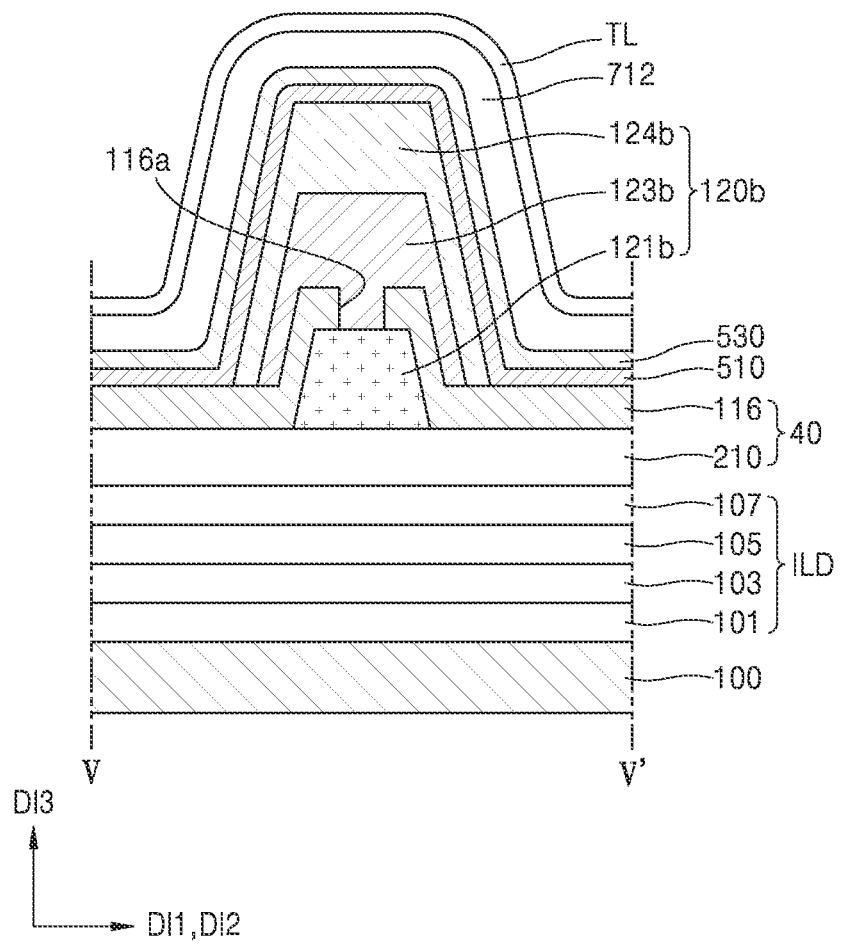

FIGS. 5A to 5C are cross-sectional views of the second partition wall 120b and the first common voltage supply line 116 according to embodiments.

Referring to FIG. 5A, the touch line TL may be arranged on the second partition wall 120b. In this case, the second partition wall 120b, the first inorganic encapsulation layer 510, the second inorganic encapsulation layer 530, the first insulating layer 712, and the touch line TL may be sequentially stacked. In another embodiment, though not shown in the drawing, there may not be the first insulating layer 712, and the touch line TL may be arranged on the second inorganic encapsulation layer 530 to directly contact the second inorganic encapsulation layer 530. In another embodiment, though not shown in the drawing, the cover layer 730 or the second insulating layer 714 shown in FIG. 3 may be arranged on the touch line TL.

The second partition wall 120b and the first common voltage supply line 116 may be arranged in various shapes. As an example, the first layer 121b, the second layer 123b, and the third layer 124b of the second partition wall 120b may be stacked such that cross-sections thereof have a quadrangular shape. In this case, a width of the first layer 121b, a width of the second layer 123b, and a width of the third layer 124b may be the same. In this case, the first common voltage supply line 116 may be arranged on the first layer 121b and may extend along the outer surface of the first layer 121b. In this case, the first through hole 116a may be arranged in the first common voltage supply line 116.

In this case, the first layer 121b may be formed, and then the first common voltage supply line 116 may be formed, and then the second layer 123b and the third layer 124b may be sequentially formed. In this case, the first layer 121b may include an organic material, and at least one of the second layer 123b and the third layer 124b may include an organic material. Hereinafter, for convenience of description, the case where both the second layer 123b and the third layer 124b include an organic material is mainly described in detail.

In the case where the second layer 123b is formed with the first layer 121b and the first common voltage supply line 116 stacked, the second layer 123b may be formed by arranging a material that forms the second layer 123b on the first common voltage supply line 116 and hardening the material. In this case, a gas included inside the first layer 121b may be exhausted to the outside due to heat applied while second layer 123b is formed. In this case, the movement of the gas may be blocked or hindered by the first common voltage supply line 116 arranged on the outer surface of the first layer 121b. In this case, the first layer 121b may be swollen and the height of the first layer 121b may increase compared to an existing height (or a designed height) of the first layer 121b before the second layer 123 is formed. In this case, the height of the first common voltage supply line 116 may increase compared to an existing height (or a designed height) thereof, or an upper side of the cross-sectional shape of the first layer 121b and the first common voltage supply line 116 may become convex. In this case, the gas occurring from the first layer 121b may pass through the first through hole 116a formed in the first common voltage supply line 116. In this case, due to the first through hole 116a, the first layer 121b and the first common voltage supply line 116 may not be swollen. In this case, the gas of the first layer 121b may be equally discharged through the first through hole 116a even in the case where the third layer 124b is formed.

The first through hole 116a may not be necessarily arranged in the upper surface of the first layer 121b. As an example, though not shown in the drawing, the first through hole 116a may be arranged in the lateral surface of the cross-section of the first layer 121b. In this case, the gas occurring from the first layer 121b may be discharged to the outside through the first through hole 116a.

Referring to FIG. 5B, respective layers of the partition wall 120 may be arranged in a pyramid shape. As an example, as shown in FIG. 5B, the first layer 121b, the second layer 123b, and the third layer 124b of the second partition wall 120b may be formed to narrow from the lower portion thereof to the upper portion thereof. In this case, the first common voltage supply line 116 may be formed along the outer surface of the first layer 121b and arranged between the first layer 121b and the second layer 123b. The first common voltage supply line 116 may include the first through hole 116a. The first through hole 116a may be variously arranged in various shapes as shown in FIGS. 4A to 4F.

Referring to FIG. 5C, the respective layers of the partition wall 120 may be arranged such that an upper layer surrounds a lower layer in a pyramid shape. As an example, the first layer 121b of the second partition wall 120b is arranged in a lowermost portion, and the first common voltage supply line 116 may be arranged to surround the first layer 121b. In addition, the second layer 123b may be arranged to completely surround the first layer 121b and surround a portion of the outer surface of the first common voltage supply line 116. In addition, the third layer 124b may be arranged to surround the second layer 123b. In this case, the first layer 121b and the second layer 123b may not be exposed to the outside. In this case, the first common voltage supply line 116 may include the first through hole 116a, and the first through hole 116a may be variously arranged in various shapes as shown in FIGS. 4A to 4F. In addition, the first through hole 116a may be arranged in the upper side of the outer surface of the first layer 121b.

A portion of the second layer 123b may be inserted into the first through hole 116a. In this case, the first layer 121b may be connected to the second layer 123b.

In the case where the first through hole 116a is arranged as shown in FIG. 3, though not shown in FIGS. 5A to 5C, the first through hole 116a may be arranged to be biased to the left of FIGS. 5A to 5C in FIGS. 5A to 5C.

The first inorganic encapsulation layer 510, the second inorganic encapsulation layer 520, the first insulating layer 712, and the touch line TL may be sequentially stacked on the second partition wall 120b.

Figure 6A:
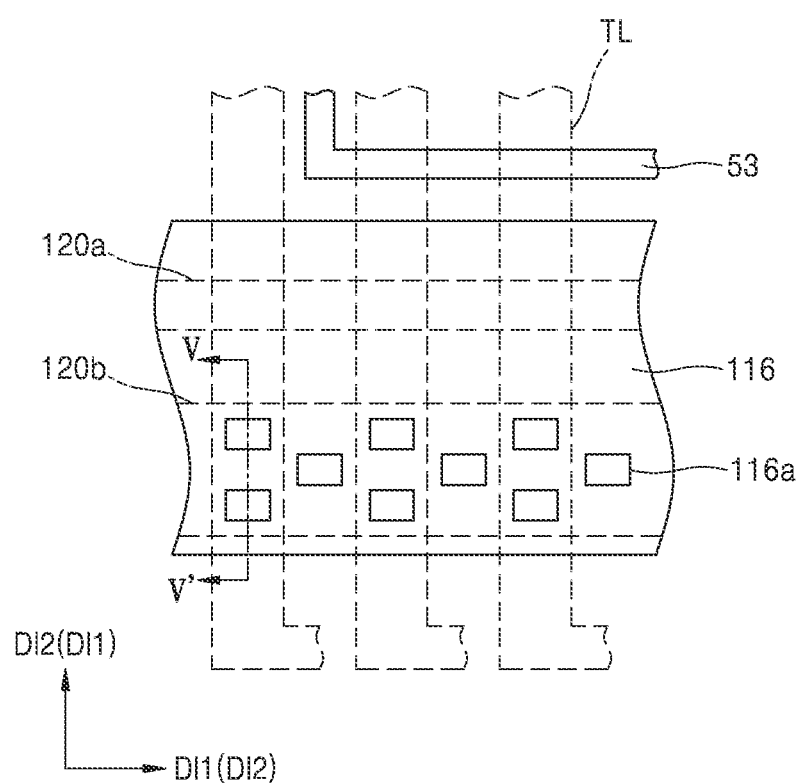
FIG. 6A is a plan view showing relationship between a first common voltage supply line and a second partition wall of a display apparatus according to another embodiment.
Figure 6B:
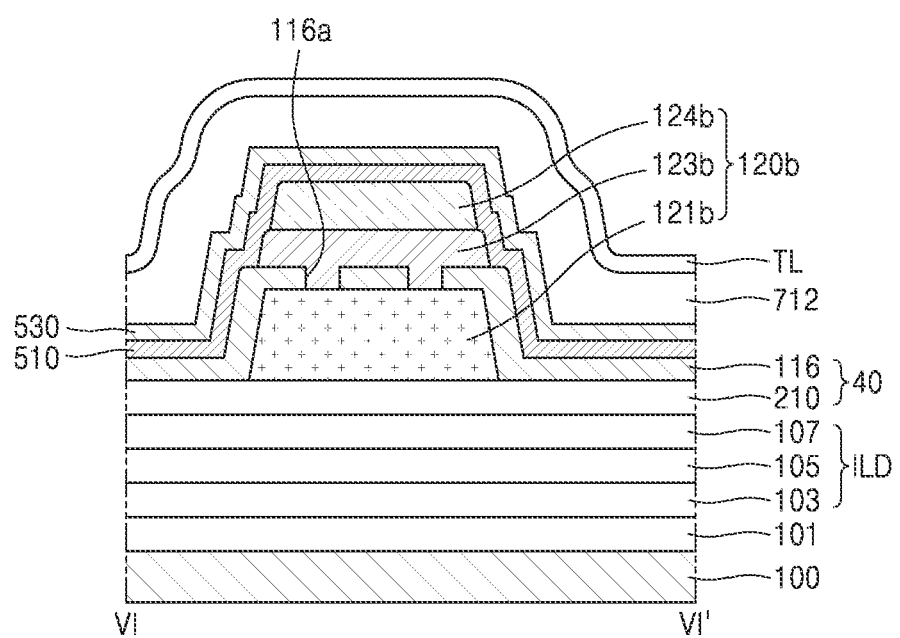
FIG. 6B is a cross-sectional view showing a relationship between a first common voltage supply line and a second partition wall shown in FIG. 6A.

FIG. 6A is a plan view showing relationship between the first common voltage supply line 116 and the second partition wall 120b of a display apparatus according to another embodiment. FIG. 6B is a cross-sectional view showing relationship between the first common voltage supply line 116 and the second partition wall 120b shown in FIG. 6A.

Referring to FIGS. 6A and 6B, the first common voltage supply line 116 may overlap the second partition wall 120b in a plan view and be arranged between the first layer 121b and the second layer 123b of the second partition wall 120b. In this case, at least a portion of the first common voltage supply line 116 and the second partition wall 120b may extend in the same direction.

In this case, the first common voltage supply line 116 may be arranged to surround the first layer 121b as shown in a cross-sectional view of FIG. 6B.

The first common voltage supply line 116 may include a plurality of first through holes 116a. In this case, the plurality of first through holes 116a may be variously arranged and may have various shapes. As an example, at least two of the plurality of first through holes 116a may be arranged in a first direction and a second direction. That is, as shown in FIG. 6A, two first through holes 116a may be arranged in the DI2-direction, and two or more first through holes 116a may be arranged in a line in the DI1-direction. In this case, the two first through holes 116a arranged in the DI2-direction may overlap the touch line TL in a plan view.

The number of first through holes 116a arranged in the DI2-direction among the plurality of first through holes 116a may be arranged different from each other in the DI1-direction. As an example, one first through hole 116a may be arranged beside a portion in which two first through holes 116a are arranged in the DI2-direction. The first through holes 116a may be arranged in the first common voltage supply line 116 such that a combination of the first through holes 116a is repeated in the DI1-direction. In another embodiment, two first through holes 116a may be arranged in the DI2-direction, and each first through hole 116a may be arranged in a line in the DI1-direction. In another embodiment, the plurality of first through holes 116a may be arranged in the DI2-direction, the plurality of first through holes 116a may constitute a group, and the group may be repeatedly arranged in the DI1-direction.

In this case, the gas occurring from the first layer 121b due to heat applied while at least one of the second layer 123b and the third layer 124b of the second partition wall 120b is formed may be effectively discharged through the first through hole 116a.

In this case, the first through hole 116a may have various planar shapes. As an example, the first through hole 116a may have a planar shape shown in at least one of FIGS. 4A to 4F. In addition, the first through hole 116a may have a cross-section shown in FIG. 6B.

Referring to FIG. 6B, the first common voltage supply line 116 may be arranged on the second partition wall 120b of the partition wall. The touch line TL may be arranged on the first common voltage supply line 116. In this case, the first common voltage supply line 116 and the touch line TL may extend in different directions.

The plurality of first through holes 116a may be arranged in the first common voltage supply line 116. In this case, at least two of the plurality of first through holes 116a may be arranged in the cross-section of the first layer 121b of the second partition wall 120b. In this case, the gas occurring from the first layer 121b due to heat applied while the second layer 123b and the third layer 124b are formed after the first layer 121b is formed may be swiftly discharged through the first through hole 116a.

As described above, the first inorganic encapsulation layer 510, the second inorganic encapsulation layer 520, the first insulating layer 712, and the touch line TL may be sequentially stacked on the second partition wall 120b.

Figure 7:
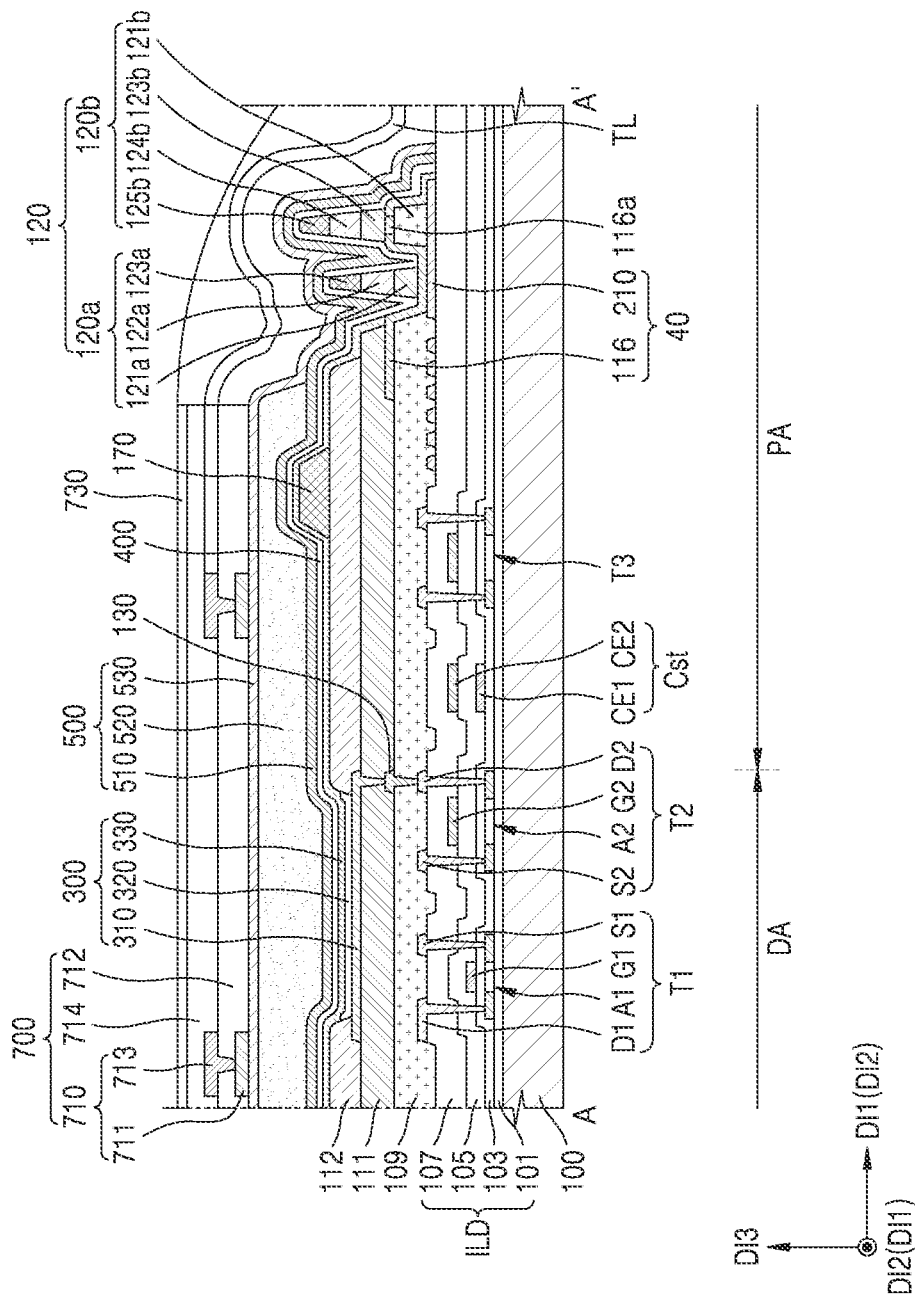
FIG. 7 is a cross-sectional view of a display apparatus according to another embodiment.

FIG. 7 is a cross-sectional view of the display apparatus 10 according to another embodiment.

Referring to FIG. 7, the display apparatus 10 may be similar to the form shown in FIG. 3. Hereinafter, for convenience of description, portions different from FIG. 3 are mainly described in detail.

The display apparatus 10 may include a spacer 170. In this case, the spacer 170 may be arranged on the pixel-defining layer 112. The spacer 170 may be arranged on the pixel-defining layer 112 or formed as one body with the pixel-defining layer 112. The spacer 170 may have various shapes. As an example, the spacer 170 may be formed in a protrusion shape and provided in a plurality. The plurality of spacers 170 may be apart from each other on the pixel-defining layer 112. In another embodiment, one spacer 170 may be provided in a space between sub-pixels adjacent to each other (or between intermediate layers adjacent to each other). In this case, the spacer 170 is not limited thereto and may prevent a chopping defect from occurring when each mask sheet enters the opening of the pixel-defining layer 112 or each mask sheet is closely attached to the pixel-defining layer 112 and contacts the substrate 100 during deposition of a deposition material on the substrate 100, the chopping defect damaging or destroying a portion of the substrate 100. Particularly, the spacer 170 may maintain an interval between the end of the opening area of the pixel-defining layer 112 and each mask assembly while each mask assembly is closely attached to the substrate 100. In this case, the spacer 170 may not overlap each intermediate layer.

The spacer 170 may be simultaneously formed as one body with the pixel-defining layer 112 while the pixel-defining layer 112 is formed, or be separately formed on the pixel-defining layer 112 after the pixel-defining layer 112 is formed. In this case, the spacer 170 may include a material that is the same as or different from the material of the pixel-defining layer 112. Hereinafter, for convenience of description, the case where the spacer 170 includes the same material as that of the pixel-defining layer 112 is mainly described in detail.

The first partition wall 120a may include the first layer 121a, the second layer 122a, and the third layer 123a, the first layer 121a being on the first common voltage supply line 116 and the second common voltage supply line 210, the second layer 122a being on the first layer 121a, and the third layer 123a being on the second layer 122a. In this case, the first layer 121a may include the same material as that of the second planarization layer 111, the second layer 122a may include the same material as that of the pixel-defining layer 112, and the third layer 123a may include the same material as that of the spacer 170.

The second partition wall 120b may include the first layer 121b, the second layer 123b, and the third layer 124b, and the fifth layer 125b, the second layer 123b being on the first common voltage supply line 116, the third layer 124b being on the second layer 123b, and the fourth layer 125b being on the third layer 124b. In this case, the first common voltage supply line 116 may be arranged between the first layer 121b and the second layer 123b. In this case, the first common voltage supply line 116 may have the first through hole 116a having the shape shown in one of FIGS. 4A to 4F and 6A.

The first partition wall 120a and the second partition wall 120b may have a cross-sectional shape shown in FIGS. 5A to 5C. In this case, the first partition wall 120a may have a shape different from that of the second partition wall 120b.

In this case, the gas occurring from the first layer 121b while the second partition wall 120b is formed may be discharged to the outside of the first layer 121b through the first through hole 116a. In this case, a portion of the second layer 123b may be inserted into the first through hole 116a.

Figure 8:
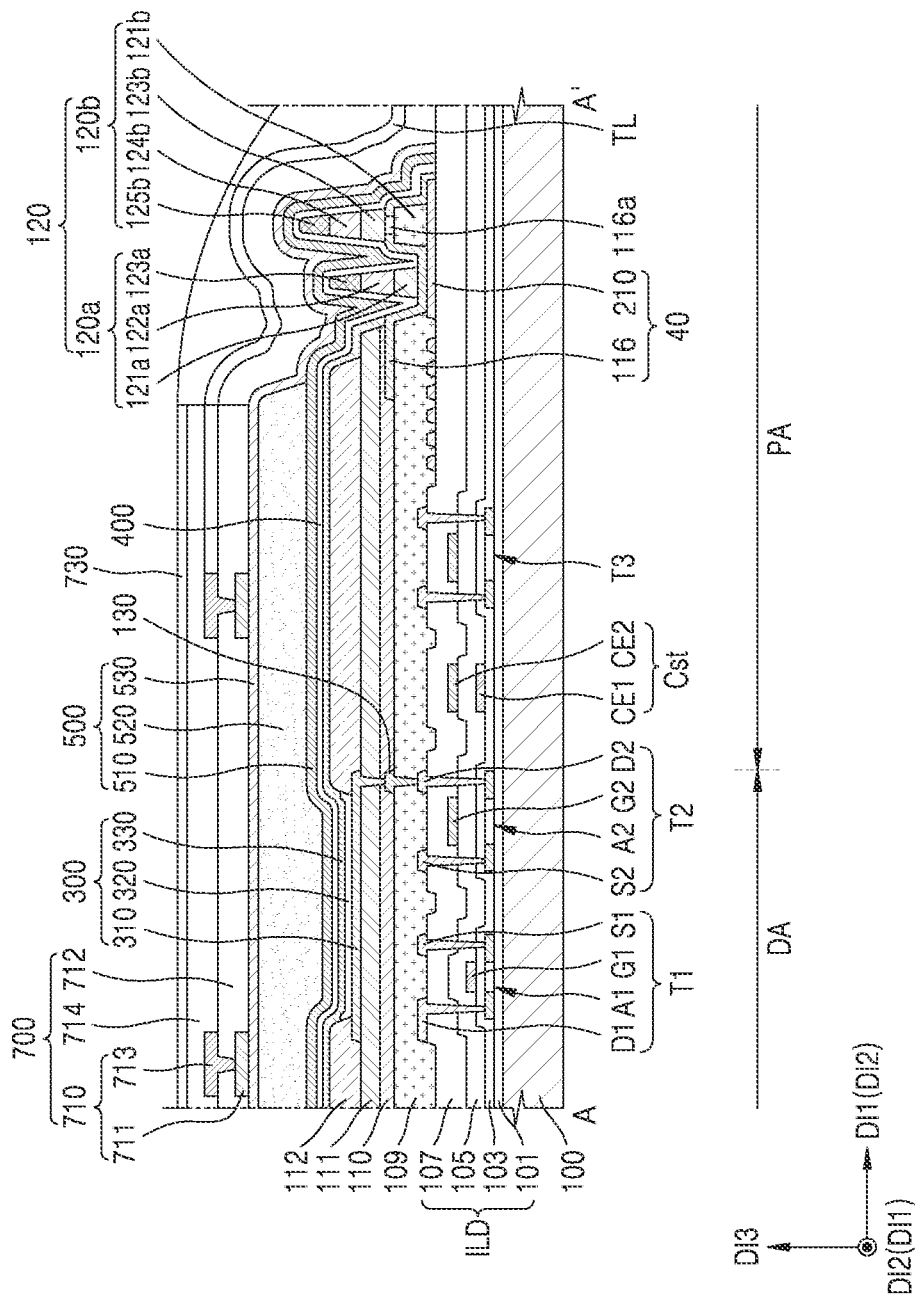
FIG. 8 is a cross-sectional view of a display apparatus according to another embodiment.

FIG. 8 is a cross-sectional view of the display apparatus 10 according to another embodiment.

Referring to FIG. 8, the display apparatus 10 may be similar to that shown in FIG. 3. Hereinafter, content different from the content shown in FIG. 3 is mainly described in detail.

The display apparatus 10 may include an intermediate planarization layer 110 and the second planarization layer 111, the intermediate planarization layer 110 being on the first planarization layer 109, and the second planarization layer 111 being on the intermediate planarization layer 110. In this case, the connection electrode 130 may be arranged on at least one of the intermediate planarization layer 110 and the second planarization layer 111. Hereinafter, for convenience of description, the case where the connection electrode 130 is arranged on the intermediate planarization layer 110 is mainly described in detail.

In this case, the first partition wall 120a on the first common voltage supply line 116 and the second common voltage supply line 210 may include the first layer 121a, the second layer 122a, and the third layer 123a, the first layer 121a including the same material as that of the intermediate planarization layer 110, the second layer 122a being on the first layer 121a and including the same material as that of the second planarization layer 111, and the third layer 123a being arranged in the same layer as the pixel-defining layer 112.

The second partition wall 120b apart from the first partition wall 120a may include the first layer 121b, the second layer 123b, the third layer 124b, and the fourth layer 125b, the first layer 121b including the same material as that of the first planarization layer 109, the second layer 123b being on the first layer 121b and the first common voltage supply line 116 and including the same material as that of the intermediate layer 110, the third layer 124b being on the second layer 123b and including the same material as that of the second planarization layer 111, and the fourth layer 125b being on the third layer 124b and including the same material as that of the pixel-defining layer 112. In this case, the first common voltage supply line 116 may include the first through hole 116a having a shape that is the same as or similar to the shape described with reference to at least one of FIGS. 4A to 4F and 6A.

In this case, when the second partition wall 120b is formed, heat may be applied during each process while the second layer 123b, the third layer 124b, and the fourth layer 125b are formed. In this case, in the case where there is no first through hole 116a in the first common voltage supply line 116, a gas may occur from the first layer 121b of the second partition wall 120b overlapping the first common voltage supply line 116 in a plan view due to heat applied while the second layer 123b, the third layer 124b, and the fourth layer 125b are formed. Because the gas occurring from the first layer 121b is blocked by the first common voltage supply line 116, the gate may remain inside the first layer 121b. In this case, as described above, the first layer 121b may be swollen and the first common voltage supply line 116 may be formed to have a curved surface. In this case, the second layer 123b, the third layer 124b, and the fourth layer 125b on the first common voltage supply line 116 may be further apart from the upper surface of the substrate 100 than a designed value, which may influence the touch line TL on the fourth layer 125b. However, as described above, the first through hole 116a may be formed and the gas from the first layer 121b may be swiftly discharged through the first through hole 116a.

Figure 9:
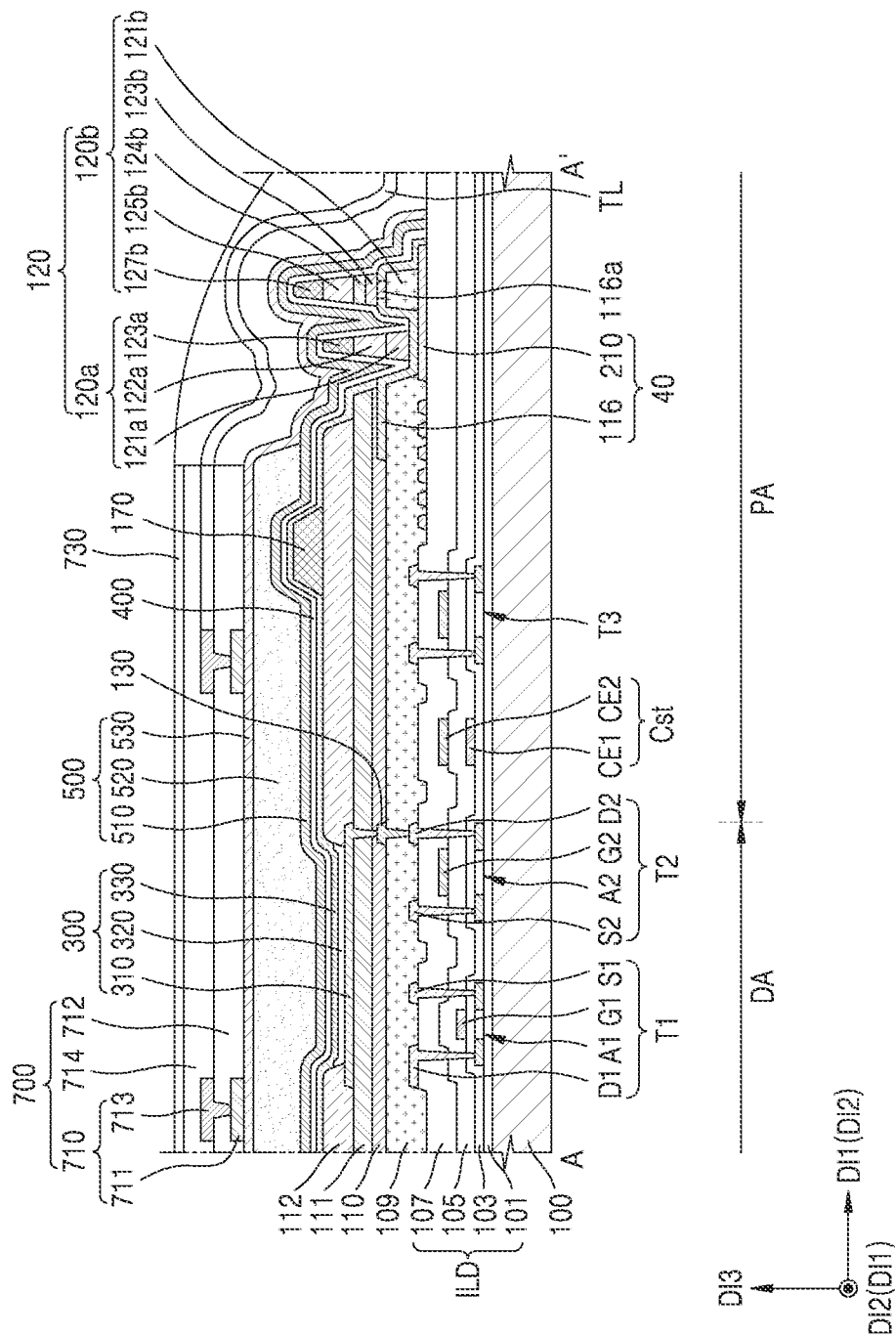
FIG. 9 is a cross-sectional view of a display apparatus according to another embodiment.

FIG. 9 is a cross-sectional view of the display apparatus 10 according to another embodiment.

Referring to FIG. 9, the display apparatus 10 may be similar to that shown in FIG. 8. Hereinafter, content different from the content shown in FIG. 8 is mainly described in detail.

The display apparatus 10 may include the spacer 170. In this case, because the spacer 170 is the same as or similar to that described with reference to FIG. 7, detailed description thereof is omitted.

In this case, the first partition wall 120a may include the first layer 121a, the second layer 122a, and the third layer 123a. In this case, the first layer 121a may be the intermediate planarization layer 110, the second layer 122a may be the second planarization layer 111, and the third layer 123a may be the pixel-defining layer 112 or the spacer 170. In another embodiment, the first layer 121a may be the intermediate planarization layer 110, the second layer 122a may be the second planarization layer 111 or the pixel-defining layer 112, and the third layer 123a may be the spacer 170. In another embodiment, the first layer 121a may be the intermediate planarization layer 110 or the second planarization layer 111, the second layer 122a may be the pixel-defining layer 112, and the third layer 123a may be the spacer 170.

The second partition wall 120b may include the first layer 121b, the second layer 123b, the third layer 124b, the fourth layer 125b, and the fifth layer 127b. In this case, the first layer 121b may include the same material as that of the first planarization layer 109, the second layer 123b may include the same material as that of the intermediate planarization layer 110, the third layer 124b may include the same material as that of the second planarization layer 111, the fourth layer 125b may include the same material as that of the pixel-defining layer 112, and the fifth layer 127b may include the same material as that of the spacer 170. In this case, the second partition wall 120b is not limited thereto and may include all structures in which at least one of the second layer 123b, the third layer 124b, the fourth layer 125b, and the fifth layer 127b is stacked on the first common voltage supply line 116.

In this case, because the first through hole 116a is formed in the first common voltage supply line 116, a space through which the gas occurring from the first layer 121b is discharged to the outside of the first layer 121b may be provided.

Figure 10:
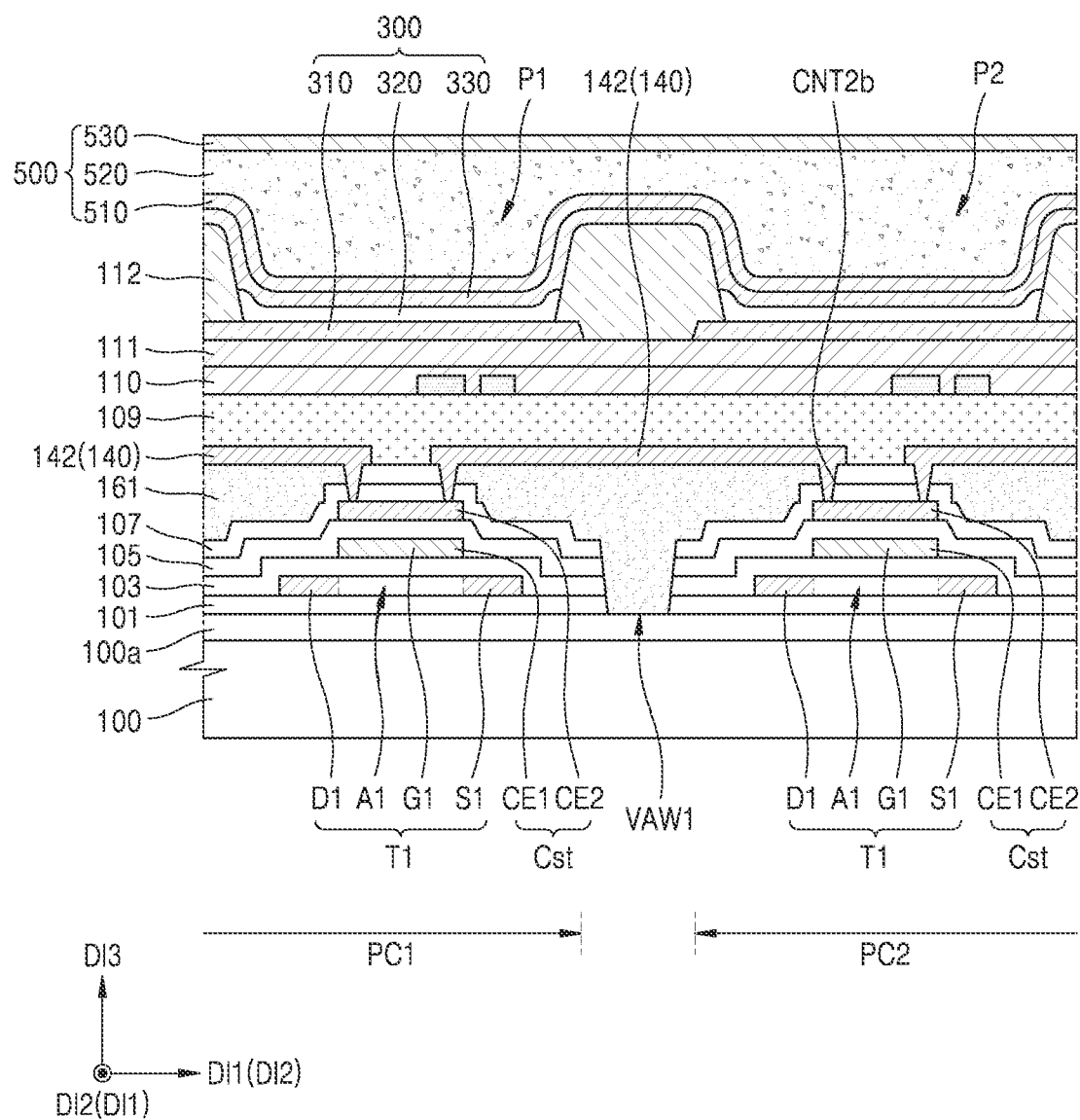
FIG. 10 is a cross-sectional view of a display apparatus according to another embodiment.

FIG. 10 is a cross-sectional view of a display apparatus according to another embodiment.

Referring to FIG. 10, the display apparatus 10 may be formed similar to that shown in FIG. 5.

The display apparatus according to an embodiment includes an inorganic insulating layer and a first organic planarization layer 161, the inorganic insulating layer including a lower valley VAW1 in a region between a plurality of pixel circuits, that is, first and second pixel circuits PC1 and PC2, and the first organic planarization layer 161 filling the lower valley VAW1. In the present specification, the lower valley VAW1 denotes an opening or a groove formed by removing a partial region of the inorganic insulating layer.

In addition, the display apparatus according to an embodiment may include a horizontal connection line 140 or a vertical connection line arranged on the interlayer insulating layer 107, the horizontal connection line 140 crossing the interlayer insulating layer 107 in the first direction, and the vertical connection line crossing the interlayer insulating layer 107 in the second direction.

In an embodiment, a barrier layer 100a, the buffer layer 101, the first gate insulating layer 103, the second gate insulating layer 105, and the interlayer insulating layer 107 arranged below the horizontal connection line 140 and including an inorganic material may be collectively referred to as an inorganic insulating layer. The inorganic insulating layer may include the lower valley VAW1 in a region formed as an opening or a groove in a region between pixel circuits adjacent to each other.

It is shown in FIG. 10 that the inorganic insulating layer includes the lower valley VAW1 formed as a groove. That is, the barrier layer 100a may be continuous over a first pixel circuit PC1 and the second pixel circuit PC2 which are pixels adjacent to each other. In addition, the buffer layer 101, the first gate insulating layer 103, the second gate insulating layer 105, and the interlayer insulating layer 107 may respectively include openings in the region between pixels adjacent to each other.

Accordingly, it may be understood that the inorganic insulating layer has the lower valley VAW1 formed as a groove in a region between pixels adjacent to each other, the inorganic insulating layer including the buffer layer 101, the first gate insulating layer 103, the second gate insulating layer 105, and the interlayer insulating layer 107. The groove may denote a trench formed in the inorganic insulating layer.

An opening of the inorganic insulating layer may mean that openings are formed in all of the buffer layer 101, the first gate insulating layer 103, the second gate insulating layer 105, and the interlayer insulating layer 107 such that the substrate 100 is exposed.

The inorganic insulating layer may include various shapes of grooves different from the opening. As an example, a portion of the upper surface of the barrier layer 100a may be removed. Unlike this, the lower surface of the buffer layer 101 may remain without being removed. Various modifications may be made.

To form the lower valley VAW1 formed as the opening or groove GR, layers are formed up to the interlayer insulating layer 107 and then separate mask process and etching process may be performed. The openings of the buffer layer 101, the first gate insulating layer 103, the second gate insulating layer 105, and the interlayer insulating layer 107 may be formed through the etching process. The etching process may be a dry etching process.

The first organic planarization layer 161 may fill the lower valley VAW1 of the inorganic insulating layer. In addition, the horizontal connection line 140 is arranged on the interlayer insulating layer 107 and the first organic planarization layer 161.

The lower valley VAW1 of the inorganic insulating layer and the first organic planarization layer 161 filling the lower valley VAW1 may be introduced to reduce an influence from an external impact on the display apparatus. Because the inorganic insulating layer has a higher hardness than the first organic planarization layer 161, a probability that cracks occur due to an external impact is very high. In the case where cracks occur in the inorganic insulating layer, a probability that cracks occur also in various signal lines arranged in the intermediation portion or upper portion of the inorganic insulating layer and a defect such as disconnection and the like occurs becomes very high.

In contrast, in the display apparatus according to an embodiment, because the inorganic insulating layer has the lower valley VAW1 in a region between a plurality of pixel circuits, and the first organic planarization layer 161 fills the lower valley VAW1, a probability that cracks propagate becomes extremely low even when there is an external impact. In addition, because the first organic planarization layer 161 has a lower hardness than the inorganic layer, the first organic planarization layer 161 may absorb stress due to an external impact and effectively reduce stress concentrated on the horizontal connection lines 140 arranged on the first organic planarization layer 161.

The horizontal connection line 140 may be arranged on the first organic planarization layer 161. Though not shown in the drawing, the vertical connection line may be arranged on the second planarization layer 111 to connect the plurality of pixel circuits to each other. The horizontal connection line 140 and the vertical connection line may serve as wirings configured to transfer electric signals to the plurality of pixels.

The barrier layer 100a may be further arranged between the substrate 100 and the buffer layer 101. The barrier layer 100a may prevent or reduce impurities from the substrate 100 and the like from penetrating into a semiconductor layer. The barrier layer 100a may include an inorganic material such as oxide or nitride, an organic material, or an organic/ inorganic composite material and have a single-layered structure or a multi-layered structure of an inorganic material and an organic material.

The buffer layer 101 may increase flatness of the upper surface of the substrate 100 and include an inorganic material such as silicon oxide, silicon nitride, or silicon oxynitride and the like.

The first semiconductor layer A1 includes the first channel region, a first source region S1, and a first drain region D1, the first source region S1 and the first drain region D1 being on two opposite sides of the first channel region. As an example, the first source region S1 and the first drain region D1 may be doped with impurities. The impurities may include N-type impurities or P-type impurities. The first source region S1 and the first drain region D1 may respectively correspond to a first source electrode and a first drain electrode. Hereinafter, terms such as the first source region S1 and the first drain region D1 are used instead of the first source electrode and the first drain electrode.

The first gate insulating layer 103 is arranged on the first semiconductor layer A1. The first gate insulating layer 103 may include an inorganic material including oxide or nitride.

In the present embodiment, the plurality of pixel circuits are separated from each other. As an example, a semiconductor layer of the first pixel circuit PC1 is apart from a semiconductor layer of the second pixel circuit PC2.

Though not shown in the drawing, a scan line, an emission control line, and a first gate electrode G1 are arranged on the first gate insulating layer 103. The scan line, the emission control line, and the first gate electrode G1 are arranged in the same layer and include the same material. As an example, the scan line, the emission control line, and the first gate electrode G1 may include at least one of molybdenum (Mo), copper (Cu), and titanium (Ti) and the like and include a single layer or a multi-layer.

The first gate electrode G1 is an island type electrode and overlap the first channel region of the first semiconductor layer A1. The first gate electrode G1 may serve as the first electrode CE1 of the storage capacitor Cst as well as a gate electrode of the first thin-film transistor T1. That is, it may be understood that the first gate electrode G1 is one body with the first electrode CE1.

The second electrode CE2 of the storage capacitor Cst and an initialization voltage line may be arranged on the second gate insulating layer 105.

The second electrode CE2 of the storage capacitor Cst and the initialization voltage line are arranged in the same layer and includes the same material. In the present embodiment, the second electrodes CE2 of the storage capacitors Cst and the initialization voltage lines of the plurality of pixel circuits, that is, the first and second pixel circuits PC1 and PC2 are separated from each other. As an example, the second electrode CE2 of the storage capacitor Cst of the first pixel circuit PC1 is apart from the second electrode CE2 of the storage capacitor Cst of the second pixel circuit PC2. The initialization voltage line of the first pixel circuit PC1 is apart from the initialization voltage line of the second pixel circuit PC2.

The interlayer insulating layer 107 may be arranged on the second electrode CE2 of the storage capacitor Cst and the initialization voltage line.

The interlayer insulating layer 107 may include silicon oxide ($SiO_x$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_2$). The lower valley VAW1 may be arranged on the interlayer insulating layer 107.

The first organic planarization layer 161 may be arranged inside the lower valley VAW1. In this case, the first organic planarization layer 161 may include at least one of acryl, methacryl, polyester, polyethylene, polypropylene, polyethylene terephthalate, polyethylene naphthalate, polycarbonate, polyimide, polyethylene sulfonate, polyoxymethylene, polyacrylate, and hexamethyldisiloxane.

The horizontal connection line 140 is arranged on the interlayer insulating layer 107 and the first organic planarization layer 161, the connection line 140 extending in the first direction. The horizontal connection line 140 extends from the first pixel circuit PC1 to the second pixel circuit PC2 to connect the first pixel circuit PC1 to the second pixel circuit PC2. The horizontal connection line 140 may connect a plurality of pixels listed in the first direction.

In the present embodiment, conductive layers such as the semiconductor layer, the signal lines, the initialization voltage line, the first electrode CE1 and the second electrode CE2 of the storage capacitor Cst and the like are separated for each pixel. Accordingly, stress that may occur from one pixel circuit may be prevented from propagating to another pixel. Because the horizontal connection line 140 may include a material having high elongation, a defect due to stress may be reduced.

The horizontal connection line 140 may include an emission control connection line, a mesh connection line 142, a scan connection line, a previous scan connection line, and an initialization voltage connection line.

The emission control connection line connects an emission control line of the first pixel circuit PC1 to an emission control line of the second pixel circuit PC2 through a contact hole passing through the interlayer insulating layer 107 and the second gate insulating layer 105. The emission control connection line may extend in the first direction while overlapping the emission control line of the first pixel circuit PC1 and the emission control line of the second pixel circuit PC2.

The mesh connection line 142 connects the second electrode CE2 of the first pixel circuit PC1 to the second electrode CE2 of the second pixel circuit PC2 through contact holes CNT3a and CNT2b passing through the interlayer insulating layer 107. Because the second electrode CE2 of the storage capacitor Cst is connected to a driving voltage line and receives a driving voltage, the mesh connection line 142 may be configured to transfer the driving voltage to the plurality of pixels listed in the first direction. Even though a space in which a separate driving voltage line extending in the first direction is arranged is not formed, the driving voltage line having a mesh structure may be formed through the mesh connection line 142. Accordingly, a space of the storage capacitor Cst may be further secured and thus a display apparatus of high-image quality may be implemented.

The scan connection line connects a scan line of the first pixel circuit PC1 to a scan line of the second pixel circuit PC2 through a contact hole passing through the interlayer insulating layer 107 and the second gate insulating layer 105. The scan connection line may overlap the scan line of the first pixel circuit PC1 and the scan line of the second pixel circuit PC2 and extend in the first direction.

The previous scan connection line connects a previous scan line of the first pixel circuit PC1 to a previous scan line of the second pixel circuit PC2 through a contact hole passing through the interlayer insulating layer 107 and the second gate insulating layer 105. The previous scan connection line may overlap the previous scan line of the first pixel circuit PC1 and the previous scan line of the second pixel circuit PC2 and extend in the first direction.

The initialization voltage connection line connects the initialization voltage line of the first pixel circuit PC1 to the initialization voltage line of the second pixel circuit PC2 through a contact hole passing through the interlayer insulating layer 107. The initialization voltage connection line may overlap the initialization voltage line of the first pixel circuit PC1 and the initialization voltage line of the second pixel circuit PC2 and extend in the first direction.

As described above, because the horizontal connection line 140 connects the first pixel circuit PC1 to the second pixel circuit PC2, the horizontal connection line 140 may supply electric signals to the plurality of pixels.

A wiring protection layer PVX may be arranged on the horizontal connection line 140. In this case, the wiring protection layer PVX may shield only a portion or an entire surface of the horizontal connection line 140. The wiring protection layer PVX may include an inorganic insulating material, for example, silicon oxide, silicon nitride, or silicon oxynitride and include a single layer or a multi-layer including the above materials.

The first planarization layer 109 is arranged on the interlayer insulating layer 107 and the wiring protection layer PVX.

The vertical connection line is arranged on the first planarization layer 109, the vertical connection line extending in the second direction. The vertical connection line is insulated from the horizontal connection line by the first planarization layer 109. The vertical connection line may include a data line, the driving voltage line, a first node connection line, a second node connection line, and an intermediate connection line.

The first organic planarization layer 161 fills the lower valley VAW1 of the inorganic insulating layer between the first pixel circuit PC1 and the second pixel circuit PC2, and simultaneously, is arranged between the first pixel circuit PC1 and the second pixel circuit PC2.

The first organic planarization layer 161 may include at least one of acryl, methacryl, polyester, polyethylene, polypropylene, polyethylene terephthalate, polyethylene naphthalate, polycarbonate, polyimide, polyethylene sulfonate, polyoxymethylene, polyacrylate, and hexamethyldisiloxane. In an embodiment, the first organic planarization layer 161 may include polyimide, phenylene, and siloxane-based high heat-resistant organic materials. Such materials may be advantageous in forming a contact hole in the first organic planarization layer 161. However, the embodiment is not limited thereto.

The inorganic insulating layer may have a high hardness but be vulnerable against stress compared to the first organic planarization layer 161. The first organic planarization layer 161 may absorb stress due to characteristics of an organic material.

Because the inorganic insulating layer includes the lower valley VAW1 that is formed by removing a portion of the inorganic insulating layer, and the first organic planarization layer 161 fills the lower valley VAW1, stress that may be applied to the display apparatus or cracks due to the stress may be prevented from propagating between the pixel circuits, that is, the first and second pixel circuits PC1 and PC2.

In addition, the first organic planarization layer 161 may reduce defects that may occur while the horizontal connection line 140 on the first organic planarization layer 161 is formed and reduce coupling that may occur between the vertical connection lines arranged on the horizontal connection line 140.

When the upper surface of the first organic planarization layer 161 is not flat and a portion of the upper surface is convex, the width of the horizontal connection line 140 may be changed while the horizontal connection line 140 is formed by patterning the conductive layer. In addition, when the horizontal connection line 140 is formed convex along the shape of the first organic planarization layer 161, coupling may occur between the horizontal connection line 140 and the vertical connection line thereon. Accordingly, it is preferable that the upper surface of the first organic planarization layer 161 is formed flat.

The horizontal connection line 140 is arranged on the first organic planarization layer 161. The horizontal connection line 140 overlaps the lower valley VAW1 arranged in a region between the first pixel circuit PC1 and the second pixel circuit PC2.

The organic light-emitting diode 300 may be arranged on the second planarization layer 111, the organic light-emitting diode 300 including the pixel electrode 310, the opposite electrode 330, and the intermediate layer 320, the intermediate layer 320 being between the pixel electrode 310 and the opposite electrode 330 and including an emission layer.

The pixel electrode 310 is connected to the intermediate connection line through a contact hole defined in the second planarization layer 111 and connected to a drain region of a sixth thin-film transistor through the intermediate connection line.

The pixel-defining layer 112 may be arranged on the second planarization layer 111. The pixel-defining layer 112 defines a pixel by including an opening that corresponds to each pixel, that is, an opening that exposes at least the central portion of the pixel electrode 310. In addition, the pixel-defining layer 112 may prevent an arc and the like from occurring at the edges of the pixel electrode 310 by increasing a distance between the edges of the pixel electrode 310 and the opposite electrode 330 over the pixel electrode 310. The intermediate layer 320 of the organic light-emitting diode 300 may include a low-molecular weight material or a polymer material. In the case where the intermediate layer 320 includes a low molecular weight material, the intermediate layer 320 may have a structure in which a hole injection layer (HIL), a hole transport layer (HTL), an emission layer (EML), an electron transport layer (ETL), an electron injection layer (EIL), etc. are stacked in a single or composite configuration. The intermediate layer 320 may include various organic materials such as copper phthalocyanine (CuPc), N, N'-Di (naphthalene-1-yl)-N, N'-diphenyl-benzidine (NPB), and tris-8-hydroxyquinoline aluminum (Alq3). These layers may be formed by vacuum deposition.

In the case where the intermediate layer 320 includes a polymer material, the intermediate layer 320 may have a structure including an HTL and an EML. In this case, the HTL may include poly (3, 4-ethylenedioxythiophene) (PEDOT), and the EML may include a polymer material such as a polyphenylene vinylene (PPV)-based material and a polyfluorene-based material. The intermediate layer 320 may be formed through screen printing, inkjet printing, laser induced thermal imaging (LITI), and the like.

The intermediate layer 320 is not limited thereto and may have various structures. In addition, the intermediate layer 320 may include a layer that is one body over a plurality of pixel electrodes 310 or include a layer patterned to correspond to each of the plurality of pixel electrodes 310.

The opposite electrode 330 may be arranged in the display area DA. In an embodiment, the opposite electrode 330 may be arranged to cover the display area DA. That is, the opposite electrode 330 may be arranged as one body over a plurality of organic light-emitting diodes to correspond to the plurality of pixel electrodes 310.

Because the organic light-emitting diode 300 may be easily damaged by external moisture, oxygen and the like, the thin-film encapsulation layer 500 may cover and protect the organic light-emitting diode 300. The thin-film encapsulation layer 500 may cover the display area DA and extend to the outside of the display area DA. The thin-film encapsulation layer 500 may include the first inorganic encapsulation layer 510, the organic encapsulation layer 520, and the second inorganic encapsulation layer 530.

When needed, other layers such as a capping layer and the like may be arranged between the first inorganic encapsulation layer 510 and the opposite electrode 330. Because the first inorganic encapsulation layer 510 is formed according to a structure thereunder, the upper surface of the first inorganic encapsulation layer 510 may not be flat.

Though not shown, the spacer for preventing mask chopping may be further provided to the pixel-defining layer 112. Various functional layers may be arranged on the thin-film encapsulation layer 500, the various functional layers including a polarizing layer for reducing external light reflection, a black matrix, color filters, or a touchscreen layer including touch electrodes, and the like.

Though not shown in the drawing, the display apparatus may include the partition wall and the common voltage supply line shown in FIGS. 3 to 9.

Figure 11:
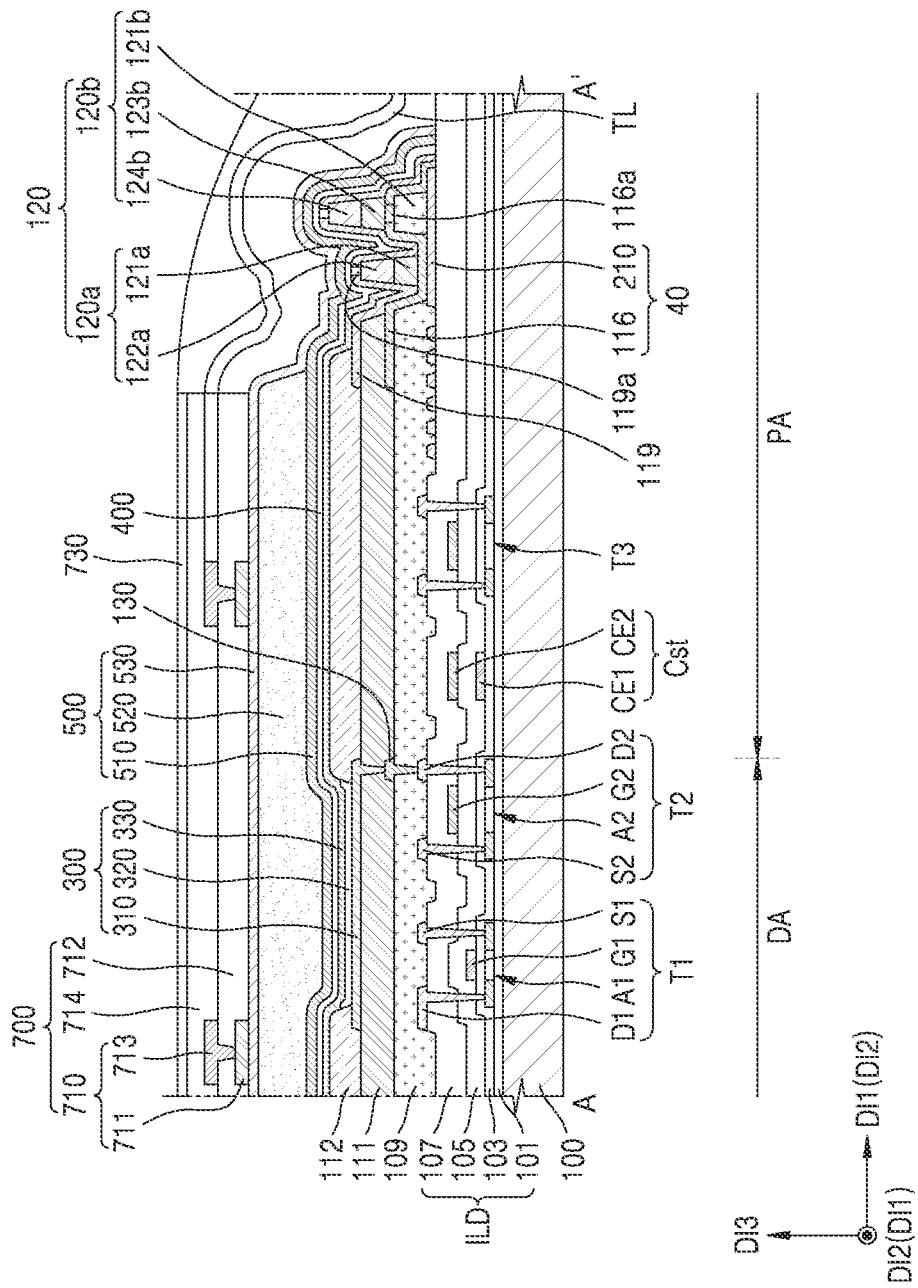
FIG. 11 is a cross-sectional view of a display apparatus according to another embodiment.

FIG. 11 is a cross-sectional view of the display apparatus 10 according to another embodiment.

Referring to FIG. 11, the display apparatus 10 may be similar to that shown in FIG. 10. Hereinafter, portions different from FIG. 10 are mainly described in detail.

The first organic planarization layer 161 may be arranged on the entire surface of the display area DA including the lower valley VAW1. In this case, the upper surface of the first organic planarization layer 161 may be flat and may absorb an impact applied from the outside. In this case, the horizontal connection line 140 may be arranged on the first organic planarization layer 161.

The first planarization layer 109 may be arranged on the horizontal connection line 140. The intermediate planarization layer 110 and the second planarization layer 111 may be sequentially arranged on the first planarization layer 109.

Though not shown, the display apparatus may include the partition wall and the common voltage supply line shown in FIGS. 3 to 9 in the peripheral area.

Figure 12:
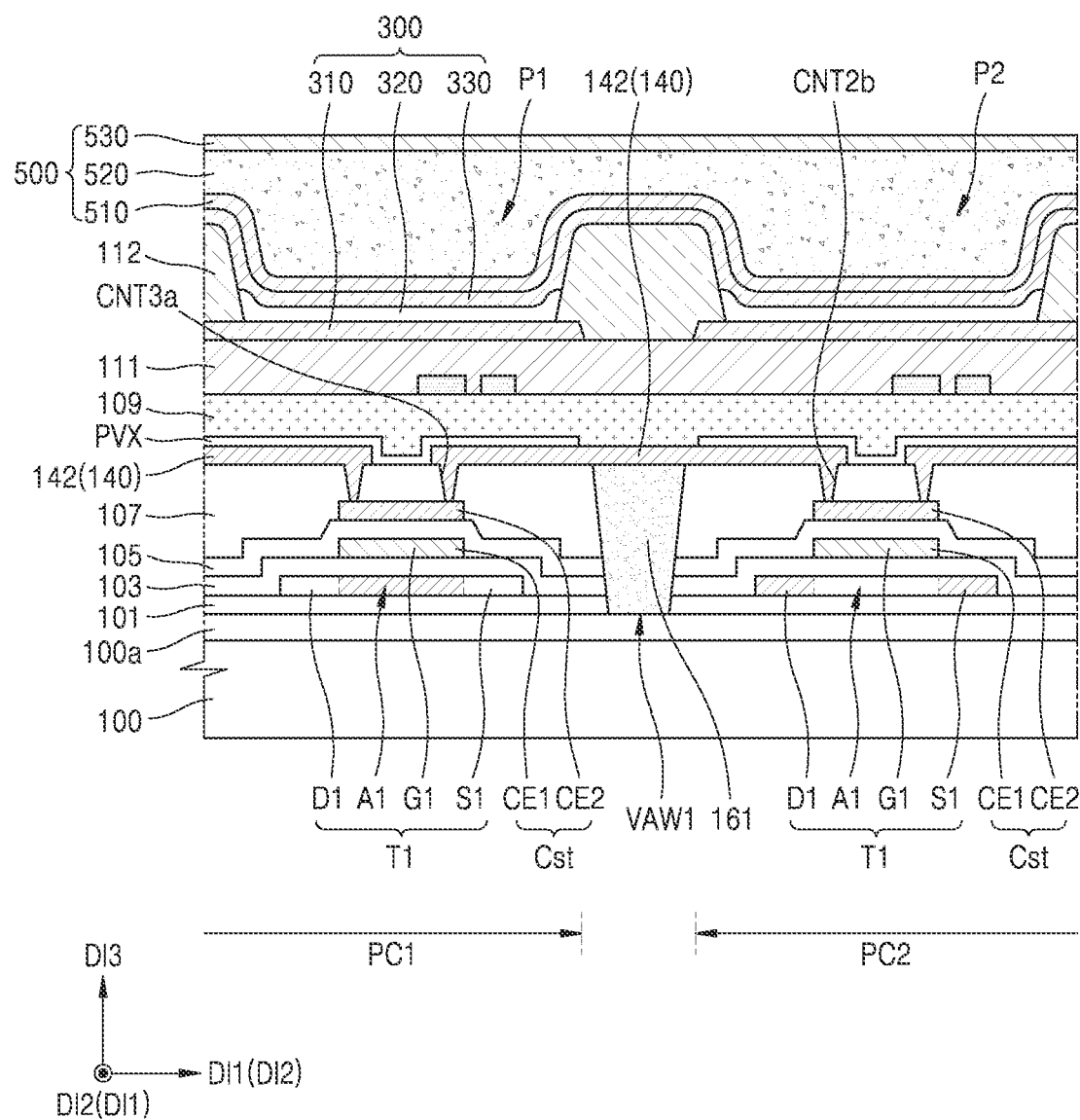
FIG. 12 is a cross-sectional view of a display apparatus according to another embodiment.

FIG. 12 is a cross-sectional view of the display apparatus 10 according to another embodiment.

Referring to FIG. 12, the display apparatus 10 may be similar to that shown in FIG. 3. Hereinafter, portions different from FIG. 3 are mainly described in detail.

The display apparatus 10 may include the first common voltage supply line 116, the second common voltage supply line 210, and a common voltage connection line 119 connecting the first common voltage supply line 116 to the opposite electrode 330.

The common voltage connection line 119 may be arranged on the second planarization layer 111. In this case, the common voltage connection line 119 may be arranged between the second planarization layer 111 and the pixel-defining layer 112 and may include the same material as that of the pixel electrode 310. In addition, the common voltage connection line 119 may be connected to the opposite electrode 330 and connected to the first common voltage supply line 116.

The common voltage connection line 119 may be arranged on the upper surface of the first common voltage supply line 116 and may extend along the upper surface of the first partition wall 120a and the second partition wall 120b. In this case, the common voltage connection line 119 may include a connection line first through whole 119a arranged in the upper surface of the first partition wall 120a and the upper surface of the second partition wall 120b. The connection line first through hole 119a may perform a function similar to that of the first through hole 116a described above.

The first partition wall 120a and the second partition wall 120b are not limited to those shown in FIG. 12 and may be formed same as those shown in FIGS. 7 to 9. In this case, the common voltage connection line 119 may extend in a direction away from the second partition wall 120b along the outer surfaces of the first partition wall 120a and the second partition wall 120b.

The second partition wall 120b and the first common voltage supply line 116 may be arranged in the shape shown in at least one of FIGS. 4A to 4F and 6A and the shape shown in FIGS. 5A to 5C and 6B.

Accordingly, because the touch line TL is not disconnected in the display apparatus 10, the occurrence of defects may be reduced. The display apparatus 10 may not only provide a clear image but also may accurately receive a user's signals.

Figure 13:
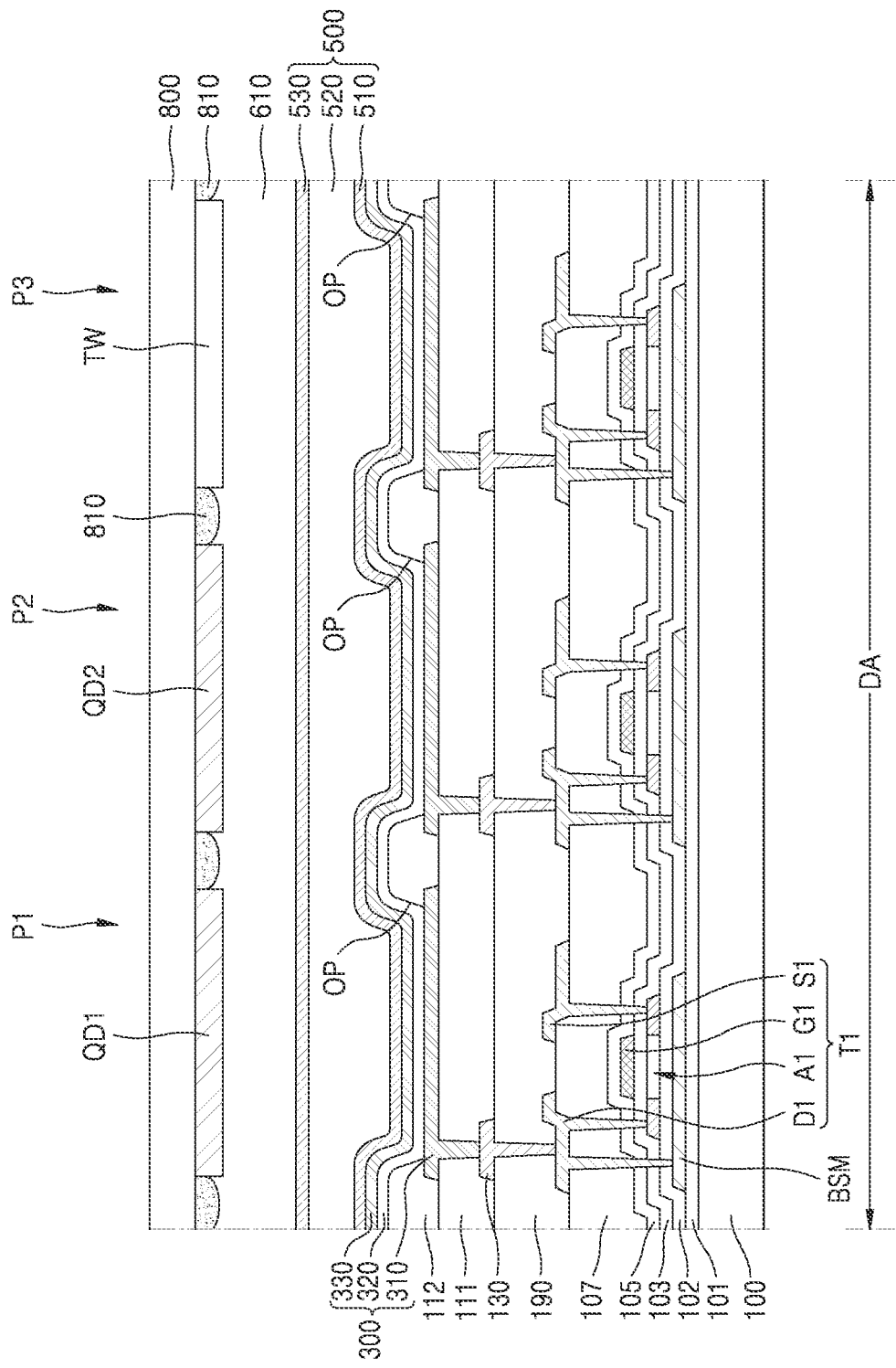
FIG. 13 is a cross-sectional view of a display apparatus according to another embodiment.

FIG. 13 is a cross-sectional view of a display apparatus according to another embodiment.

Referring to FIG. 13, the display apparatus (not shown) may include the display area DA and a peripheral area (not shown). In this case, because the peripheral area is the same as or similar to that shown in FIGS. 1 to 12, a different portion in the display area DA is described in detail.

The display apparatus may include the buffer layer 101 and an additional buffer layer 102. In this case, the buffer layer 101 and the additional buffer layer 102 may each include silicon oxide ($SiO_x$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_2$).

A bias electrode BSM may be arranged between the buffer layer 101 and the additional buffer layer 102 to correspond to the first thin-film transistor T1. That is, the bias electrode BSM may overlap the first semiconductor layer A1 of the first thin-film transistor T1. A voltage may be applied to the bias electrode BSM. The bias electrode BSM may prevent external light from reaching the first semiconductor layer A1. Accordingly, the characteristics of the first thin-film transistor T1 may be stabilized. The bias electrode BSM may be omitted depending on the case.

The first thin-film transistor T1 includes the first semiconductor layer A1, the first gate electrode G1, the first source electrode S1, and the first drain electrode D1. In this case, the first semiconductor layer A1 may include amorphous silicon or polycrystalline silicon. In another embodiment, the first semiconductor layer A1 may include an oxide of at least one of indium (In), gallium (Ga), stannum (Sn), zirconium (Zr), vanadium (V), hafnium (Hf), cadmium (Cd), germanium (Ge), chromium (Cr), titanium (Ti), aluminum (Al), cesium (Cs), cerium (Ce), and zinc (Zn). In an embodiment, the first semiconductor layer A1 may include Zn-oxide-based material and include Zn-oxide, In—Zn oxide, and Ga—In—Zn oxide. In another embodiment, the first semiconductor layer A1 may include In—Ga—Zn—O (IGZO), In—Sn—Zn—O (ITZO), or In—Ga—Sn—Zn—O (IGTZO) semiconductor containing metal such as indium (In), gallium (Ga), and stannum (Sn) in ZnO. The first semiconductor layer A1 may include the first channel region, the first source region, and the first drain region, the first source region and the first drain region being on two opposite sides of the channel region. In addition, the first semiconductor layer A1 may include a single layer or a multi-layer.

The first gate insulating layer 103, the first gate electrode G1, the second gate insulating layer 105, the interlayer insulating layer 107, the first planarization layer 109, and the second planarization layer 111 may be sequentially stacked on the first semiconductor layer A1.

The first gate electrode G1 is arranged on the first gate insulating layer 103 to overlap at least a portion of the first semiconductor layer A1. The first gate electrode G1 may include at least one of molybdenum (Mo), aluminum (Al), copper (Cu), and titanium (Ti) and the like and include a single layer or a multi-layer. The first electrode (not shown) of the storage capacitor Cst may be arranged in the same layer as the first gate electrode G1. The first electrode may include the same material as that of the first gate electrode G1.

In addition, the organic light-emitting diode 300 may be arranged on the second planarization layer 111. The organic light-emitting diode 300 may form a plurality of pixels, that is, first, second, and third pixels P1, P2, and P3. The intermediate layer 320 of the organic light-emitting diode 300 arranged in the pixels, that is, the first, second, and third pixels P1, P2, and P3 may be provided in common. Accordingly, the organic light-emitting diode 300 included in the pixels P1, P2, and P3 may emit light of the same color. As an example, the intermediate layer 320 may include an organic emission layer including a fluorescent or phosphorous material that emits blue light. A functional layer may be selectively further arranged under and on the organic emission layer, the functional layer including a hole transport layer (HTL), a hole injection layer (HIL), an electron transport layer (ETL), an electron injection layer (EIL), and the like.

The pixel-defining layer 112 may be arranged on the pixel electrode 310 of the organic light-emitting diode 300. In addition, the intermediate layer 320 and the opposite electrode 330 may be arranged on the pixels, that is, the first, second, and third pixels P1, P2, and P3 and the pixel-defining layer 112 in the display area DA entirely.

The thin-film encapsulation layer 500 may be arranged on the organic light-emitting diode 300. In this case, the thin-film encapsulation layer 500 may include the first inorganic encapsulation layer 510, the organic encapsulation layer 520, and the second inorganic encapsulation layer 530.

An optical functional layer (not shown) may be arranged over the thin-film encapsulation layer 500 to face the substrate 100. In this case, the optical functional layer may include an upper substrate 800, color-converting layers, that is, first and second color-converting layers QD1 and QD2, a transmission layer, and a light-blocking pattern 810, the upper substrate 800 facing the substrate 100, and the color conversion layers QD1 and QD2, a transmission layer TW, and the light-blocking pattern 810 being on the upper substrate 800.

The color-converting layers, that is, the first and second color-converting layers QD1 and QD2 may be layers making light emitted from the organic light-emitting diode 300 clear or converting a color into another color. The color-converting layers, that is, the first and second color-converting layers QD1 and QD2 may include quantum dots and include a quantum conversion layer. Quantum dots are semiconductor particles having a diameter of about 2 nm to about 10 nm and particles having peculiar electric and optical characteristics. When exposed to light, quantum dots may emit light in a specific frequency depending on the size of the particles and the kind of a material. As an example, when exposed to light, quantum dots may emit red, green, or blue light depending on the size of the particles or the kind of the material.

The core of the quantum dot may include one of a group II-VI compound, a group III-V compound, a group IV-VI compound, a group IV element, a group IV compound, and combinations thereof.

A group II-VI compound may include one of a two-element compound including one of CdSe, CdTe, ZnS, ZnSe, ZnTe, ZnO, HgS, HgSe, HgTe, MgSe, MgS, and a mixture thereof; a three-element compound including one of AgInS, CuInS, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a four-element compound including one of HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof.

A group III-V compound may include one of a two-element compound including one of GaN, GaP, GaAs, GaSb, AlN, AlP, AlAs, AlSb, InN, InP, InAs, InSb, and a mixture thereof; a three-element compound including one of GaNP, GaNAs, GaNSb, GaPAs, GaPSb, AlNP, AlNAs, AlNSb, AlPAs, AlPSb, InGaP, InNP, InNAs, InNSb, InPAs, InPSb, GaAlNP, and a mixture thereof; and a four-element compound including one of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof.

A group IV-VI compound may include one of a two-element compound including one of SnS, SnSe, SnTe, PbS, PbSe, PbTe, and a mixture thereof; a three-element compound including one of SnSeS, SnSeTe, SnSTe, PbSeS, PbSeTe, PbSTe, SnPbS, SnPbSe, SnPbTe, and a mixture thereof; and a four-element compound including one of SnPbSSe, SnPbSeTe, SnPbSTe, and a mixture thereof. A group IV element may include one of Si, Ge, and a mixture thereof. A group IV compound may include a two-element compound including one of SiC, SiGe, and a mixture thereof.

In this case, the two-element compound, the three-element compound, or the four-element compound may be present inside a particle at a uniform concentration, or may be divided into states with partially different concentration distributions and present in the same particle. In addition, a core-shell structure in which one quantum dot surrounds another quantum dot may be provided. An interface between the core and the shell may have a concentration gradient in which the concentration of an element existing in the shell reduces toward the center.

In an embodiment, a quantum dot may have a core-shell structure including a core and a shell, the core including a nano crystal, and the shell surrounding the core. The shell of a quantum dot may serve as a protective layer that prevents a chemical change of the core to maintain a semiconductor characteristic or serve as a charging layer for giving an electrophoretic characteristic to the quantum dot. The shell may include a single layer or a multi-layer. An interface between the core and the shell may have a concentration gradient in which the concentration of an element existing in the shell reduces toward the center. Examples of the shell of the quantum dot include oxide of metal or non-metal, a semiconductor compound, or a combination thereof.

As an example, though the oxide of metal or non-metal may include a two-element compounding including $SiO_2$, $Al_2O_3$, $TiO_2$, ZnO, MnO, $Mn_2O_3$, $Mn_3O_4$, CuO, FeO, $Fe_2O_3$, $Fe_3O_4$, CoO, $Co_3O_4$, NiO, or a three-element compound including $MgAl_2O_4$, $CoFe_2O_4$, $NiFe_2O_4$, and $CoMn_2O_4$, the embodiment is not limited thereto.

In addition, though the semiconductor compound may include CdS, CdSe, CdTe, ZnS, ZnSe, ZnTe, ZnSeS, ZnTeS, GaAs, GaP, GaSb, HgS, HgSe, HgTe, InAs, InP, InGaP, InSb, AlAs, AlP, and AlSb, the embodiment is not limited thereto.

A quantum dot may have a full width of half maximum (FWHM) of a light emission wavelength spectrum of 45 nm or less, preferably about 40 nm or less, and more preferably about 30 nm or less. Within this range, color purity or color reproduction may be improved. In addition, since light emitted from the quantum dot is emitted in all directions, a viewing angle of light may be improved.

In addition, though the shape of the quantum dot is a shape generally used in the art and is not particularly limited, the shape of the quantum dot may include a spherical shape, a pyramid shape, a multi-arm shape, or a cubic nano particle, a nano tube, a nano wire, a nano fiber, and a nano plate particle in an embodiment.

The color-converting layers, that is, first and second color-converting layers QD1 and QD2 may be arranged to correspond to at least a portion of an emission area defined by the opening OP of the pixel-defining layer 112. As an example, the first color-converting layer QD1 may correspond to an emission area of a first pixel P1, and the second color-converting layer QD2 may correspond to an emission area of a second pixel P2. The color-converting layer may not correspond to an emission area of a third pixel P3. The transmission layer TW may be arranged in the emission area of the third pixel P3. The transmission layer TW may include an organic material that may emit light without converting the wavelength of light emitted from the organic light-emitting diode 300 of the third pixel P3. However, the embodiment is not limited thereto. The color-converting layer may be arranged also in an emission area EA of the third pixel P3.

Scattering particles may be distributed in the color-converting layers, that is, first and second color-converting layers QD1 and QD2, and the transmission layer TW. Accordingly, color spreading may be uniform.

The light-blocking pattern 810 may be arranged between the color-converting layers, that is, first and second color-converting layers QD1 and QD2 and the transmissive window TW. The light-blocking pattern 810 may be a black matrix and be a member configured to improve color clarity and contrast. The light-blocking pattern 810 may be arranged between the emission areas of the pixels, that is, the first pixel P1, the second pixel P2, and the third pixel P3. The light-blocking pattern 810 may include a black matrix that absorbs a visible ray, and thus, prevent color mixing of light emitted from the emission areas of neighboring pixels and improve visibility and contrast.

In an embodiment, the plurality of organic light-emitting diodes may emit blue light. In this case, the first color-converting layer QD1 may include quantum dots that emit red light, and the second color-converting layer QD2 may include quantum dots that emit green light. Accordingly, light emitted to the outside of the display apparatus may be red, green, or blue color. Various color expression may be possible through combinations of these colors.

A filling material 610 may be further arranged between the substrate 100 and the upper substrate 800. The filling material 610 may perform a buffering function against external pressure, etc. The filling material 610 may include an organic material such as methyl silicon, phenyl silicon, and polyimide. However, the embodiment is not limited thereto and the filling material 610 may include a urethane resin, an epoxy-based resin, an acryl-based resin, which are organic sealants, or silicon, which is inorganic sealant.

Though not shown in the drawing, the display apparatus may include the partition wall and the common voltage supply line shown in FIGS. 3 to 9 in the peripheral area.

Figure 14:
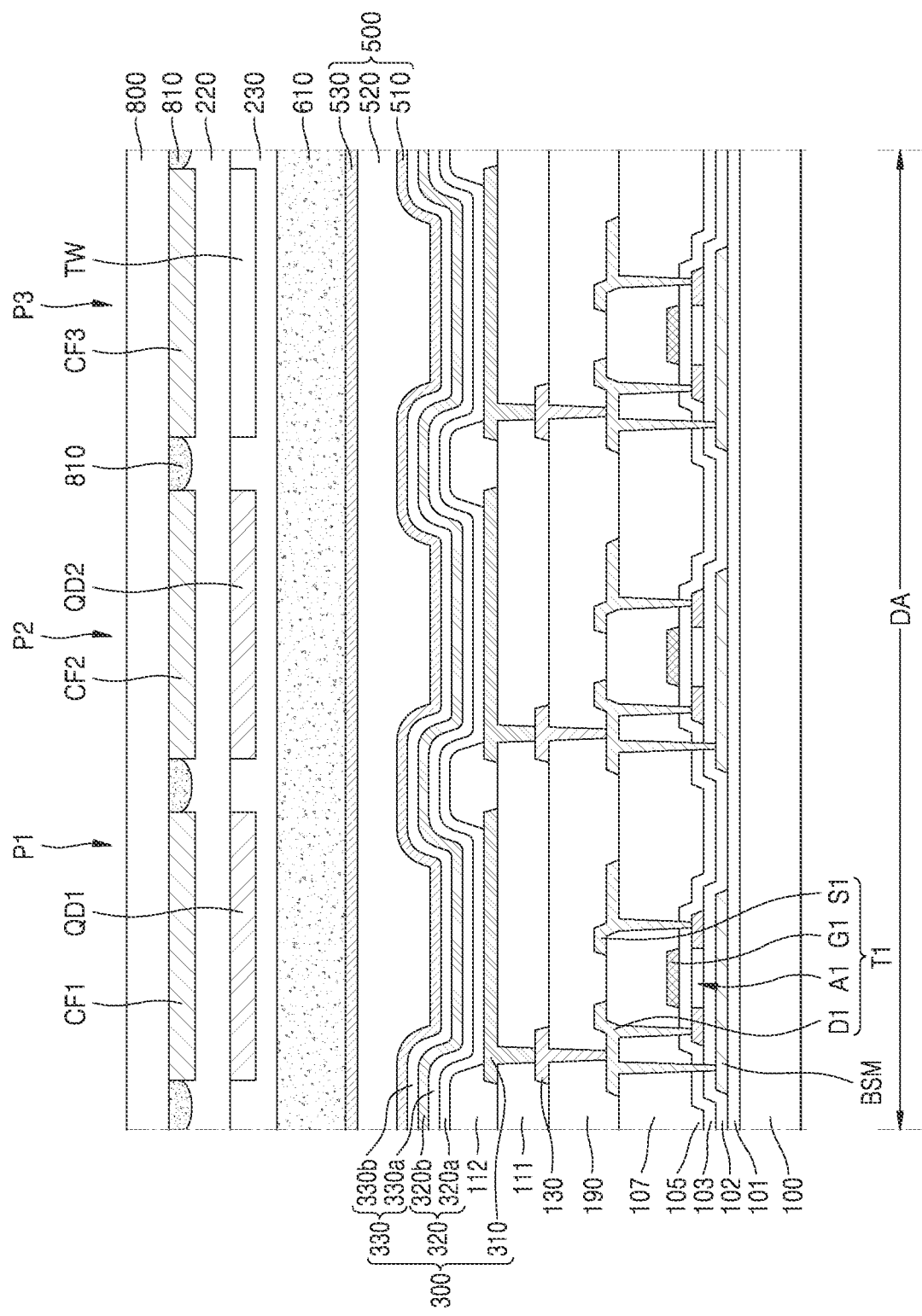
FIG. 14 is a cross-sectional view of a display apparatus according to another embodiment.

FIG. 14 is a cross-sectional view of a display apparatus according to another embodiment.

Referring to FIG. 14, the display apparatus may be similar to the display apparatus shown in FIG. 13. Hereinafter, portions different from those of the display apparatus shown in FIG. 13 are mainly described in detail.

The organic light-emitting diodes 300 included in the plurality of pixels, that is, the first to third pixels P1, P2, and P3 may include a plurality of intermediate layers, that is, first and second intermediate layers 320*a* and 320*b* and a plurality of opposite electrodes, that is, first and second opposite electrodes 330*a* and 330*b*.

As an example, the organic light-emitting diode 300 may include the first intermediate layer 320*a*, the first opposite electrode 330*a*, the second intermediate layer 320*b*, and the second opposite electrode 330*b* that are sequentially stacked on the pixel electrode 310. The first intermediate layer 320*a* and the second intermediate layer 320*b* may include an organic emission layer including a fluorescent or phosphorous material that emits red, green, blue, or white light. The organic emission layer may include a low molecular weight organic material or a polymer organic material. A functional layer may be selectively further arranged under and on the organic emission layer, the functional layer including a hole transport layer (HTL), a hole injection layer (HIL), an electron transport layer (ETL), an electron injection layer (EIL), and the like. In an embodiment, the first intermediate layer 320*a* and the second intermediate layer 320*b* may each include an organic emission layer that emits blue light.

The first opposite electrode 330*a* and the second opposite electrode 330*b* may include a light-transmissive electrode or a reflective electrode. In an embodiment, the opposite electrode 330 may be a transparent or semi-transparent electrode and include a metal thin film including Li, Ca, LiF/Ca, LiF/Al, Al, Ag, Mg, and a compound thereof and having a small work function. In addition, a transparent conductive oxide (TCO) layer may be further arranged on the metal thin film, the TCO layer including ITO, IZO, ZnO, or $In_2O_3$. The first opposite electrode 330*a* may be a floating electrode.

The first intermediate layer 320*a*, the second intermediate layer 320*b*, the first opposite electrode 330*a*, and the second opposite electrode 330*b* may be formed as one body over the plurality of pixels.

In the present embodiment, color filters, that is, first to third color filters CF1, CF2, and CF3 may be arranged on the upper substrate 800. The color filters, that is, the first to third color filters CF1, CF2, and CF3 may be introduced to implement full color images, improve color purity, and improve visibility in the outside.

The color filters, that is, the first to third color filters CF1, CF2, and CF3 may be arranged on the upper substrate 800 to correspond to the pixels, that is, the first to third pixels P1, P2, and P3. The light-blocking pattern 810 may be arranged between the color filters, that is, the first to third color filters CF1, CF2, and CF3.

A protection layer 220 may cover the light-blocking pattern 810 and the color filters, that is, the first to third color filters CF1, CF2, and CF3. The protection layer 220 may include an inorganic material such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_2$). The protection layer 220 may include an organic material such as polyimide, epoxy, and the like.

The first color-converting layer QD1, the second color-converting layer QD2, and the transmission layer TW may be arranged to overlap the first color filter CF1, the second color filter CF2, and the third color filter CF3 with the protection layer 220 therebetween. An additional protection layer 230 may be further arranged on the upper substrate 800 to cover the first color-converting layer QD1, the second color-converting layer QD2, and the transmission layer TW. The additional protection layer 230 may include an organic material or an inorganic material.

The first color-converting layer QD1 and the second color-converting layer QD2 may include quantum dots that emit light of different colors. As an example, the first color-converting layer QD1 may emit red light and the second color-converting layer QD2 may emit green light. In addition, the transmission layer TW may have blue light emitted from the organic light-emitting diode of the third pixel P3 pass therethrough.

In this case, the first color filter CF1 may be a red color filter, the second color filter CF2 may be a green color filter, and the third color filter CF3 may be a blue color filter.

Though not shown in the drawing, the display apparatus may include the partition wall and the common voltage supply line shown in FIGS. 3 to 9 in the peripheral area.

Figure 15:
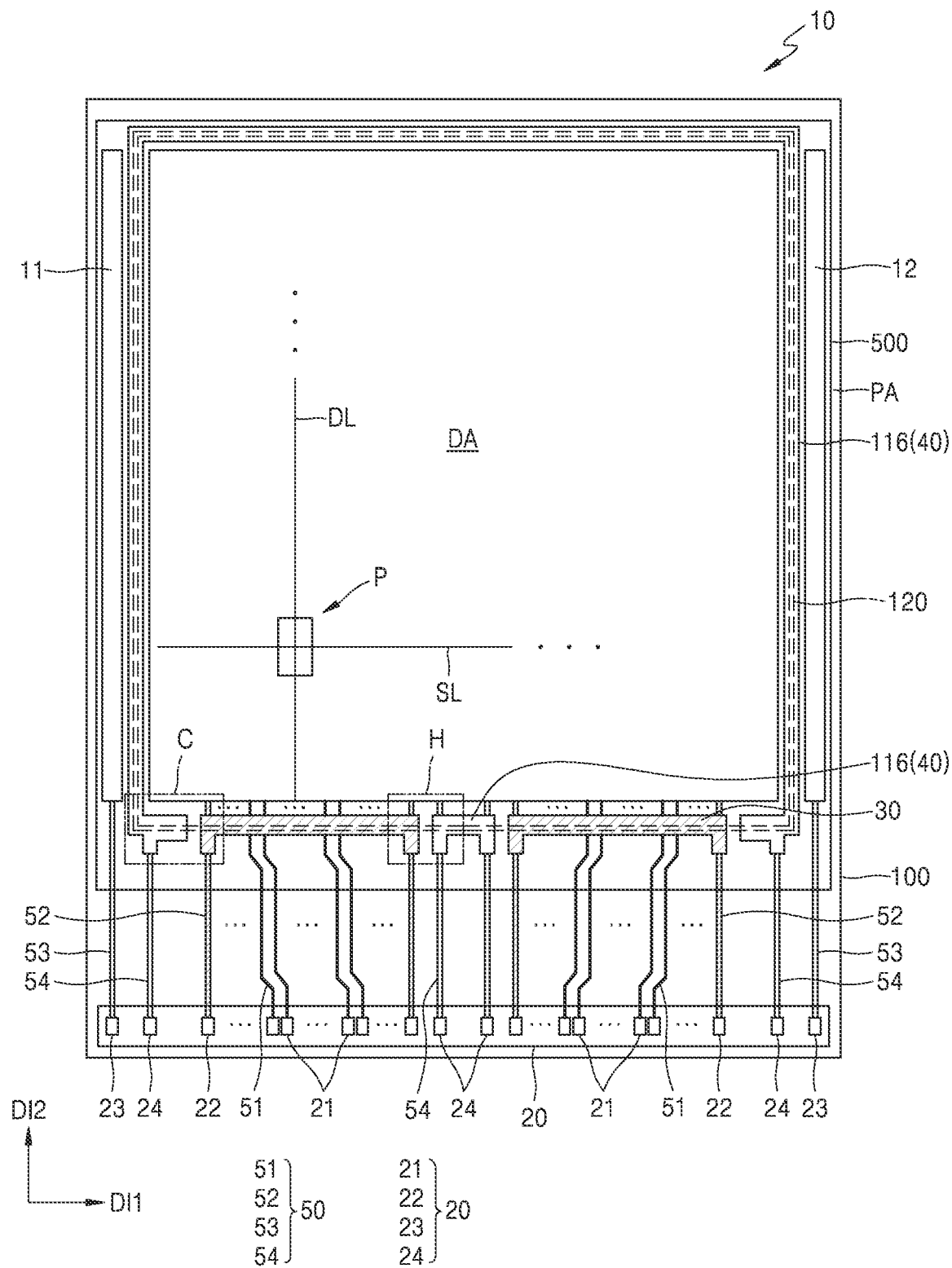
FIG. 15 is a plan view of a display apparatus according to another embodiment.

FIG. 15 is a plan view of the display apparatus 10 according to another embodiment.

Referring to FIG. 15, the display apparatus 10 may include the substrate 100, a display layer (not shown), a thin-film encapsulation layer (not shown), and an input sensing member (not shown), the display layer being in the display area DA, the thin-film encapsulation layer being on the display layer, and the input sensing member being on the thin-film encapsulation layer. In addition, the display apparatus 10 may include a circuit configured to supply power and apply signals to the display layer.

A plurality of pixels Px may be arranged in the display area DA, the first scan driver 11, the second scan driver 12, the terminal portion 20, the driving voltage supply line 30, the common voltage supply line 40, and the wiring layer 50 may be arranged in the peripheral area PA. In this case, the wiring layer 50 may include the first wiring 51, the second wiring 52, the third wiring 53, and the fourth wiring 54. Hereinafter, portions different from those of the display apparatus 10 of FIG. 1 are mainly described in detail.

The common voltage supply line 40 may be arranged similar to that shown in FIG. 1. In this case, the common voltage supply line 40 may be provided in plurality, and one of the plurality of common voltage supply lines 40 may be arranged at the lower center of the substrate 100. In addition, another of the plurality of common voltage supply lines 40 may surround the display area DA, and a portion of the other of the common voltage supply lines 40 may be bent to face one of the common voltage supply lines 40.

The driving voltage supply line 30 may be arranged between the common voltage supply lines 40 apart from each other. In this case, the driving voltage supply line 30 may be electrically insulated from the common voltage supply line 40. Each of the common voltage supply line 40 and the driving voltage supply line 30 may be connected to the terminal portion 20 through a wiring.

In FIG. 15, the common voltage supply line 40 and the driving voltage supply line 30 arranged below the display area DA may overlap the partition wall 120. In this case, at least one partition wall 120 may be provided. As an example, one partition wall 120 may be provided. In another embodiment, two or more partition walls 120 may be provided. In this case, the common voltage supply line 40 and the driving voltage supply line 30 arranged below the display area DA may overlap at least one of the two or more partition walls 120. Particularly, the common voltage supply line 40 and the driving voltage supply line 30 arranged below the display area DA may overlap a partition wall that is closest to the terminal portion 20 from among the two or more partition walls 120. In the case where the two or more partition walls 120 are provided, the partition wall that is closest to the terminal portion 20 may be the same as or similar to the second partition wall 120b in FIG. 3. In contrast, in the case where the two or more partition walls 120 are provided, the other of the partition walls 120 other than the partition wall that is closest to the terminal portion 20 may be the same as or similar to the first partition wall 120a in FIG. 3. Hereinafter, for convenience of description, the case where the partition wall 120 includes the first partition wall 120a and the second partition wall 120b is mainly described in detail.

Figure 16:
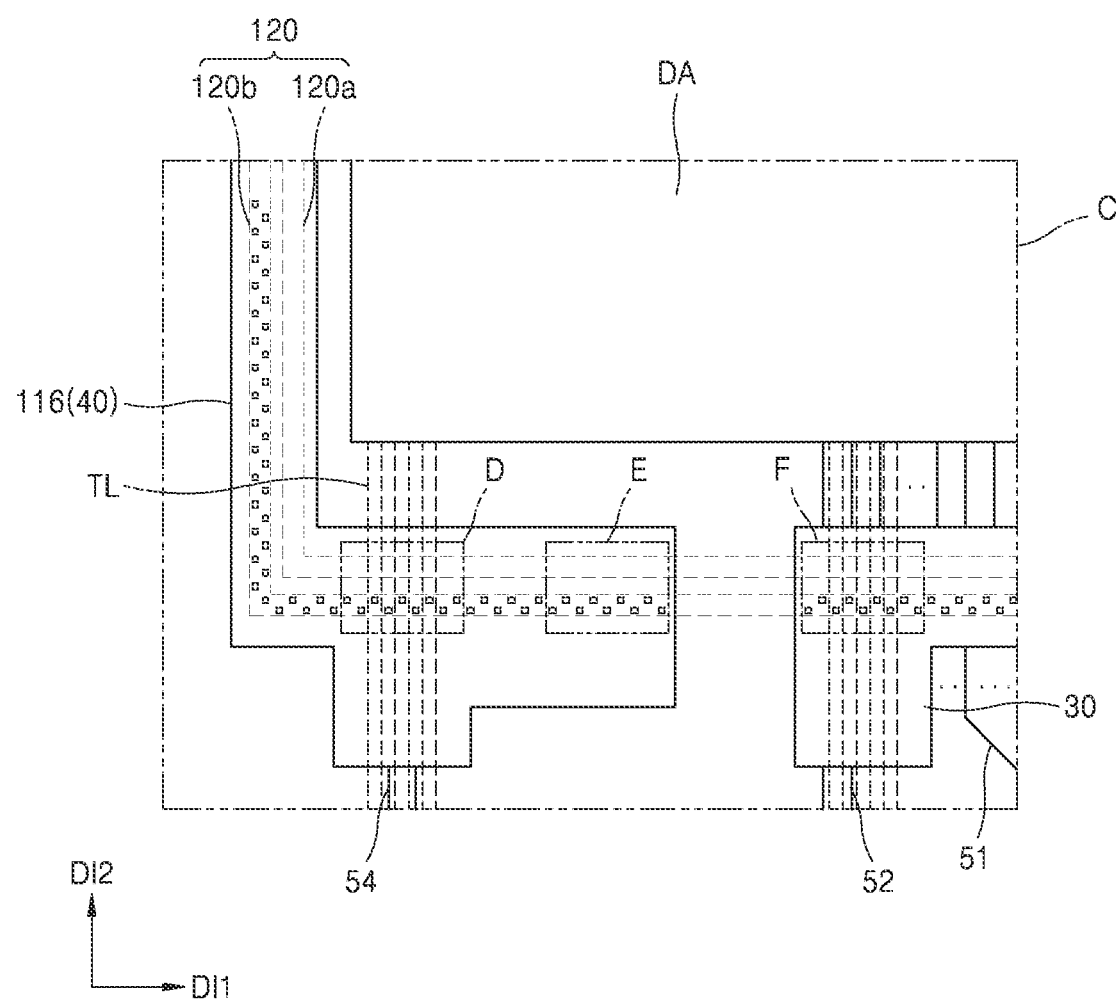
FIG. 16 is an enlarged plan view of a region C of FIG. 15.
Figure 17A:
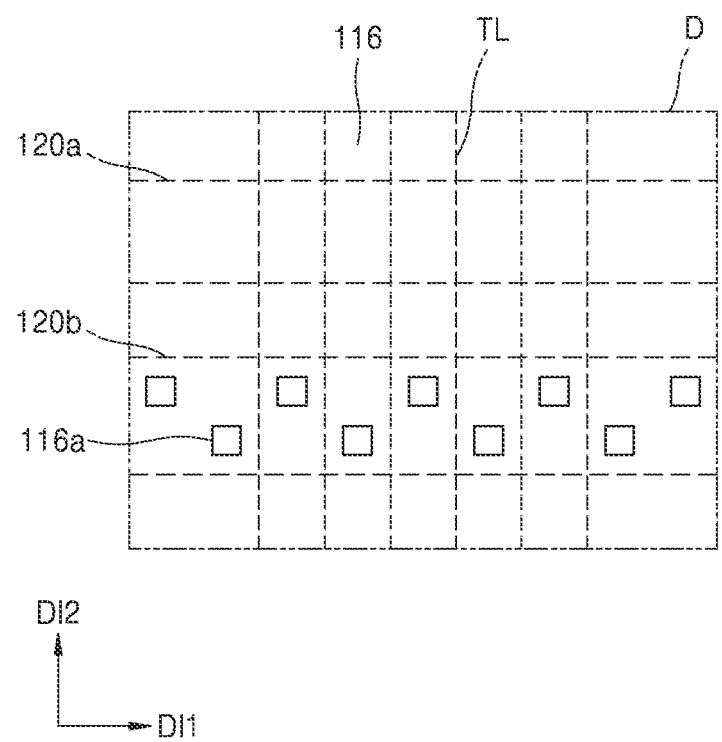
FIG. 17A is an enlarged plan view of a region D of FIG. 16.
Figure 17B:
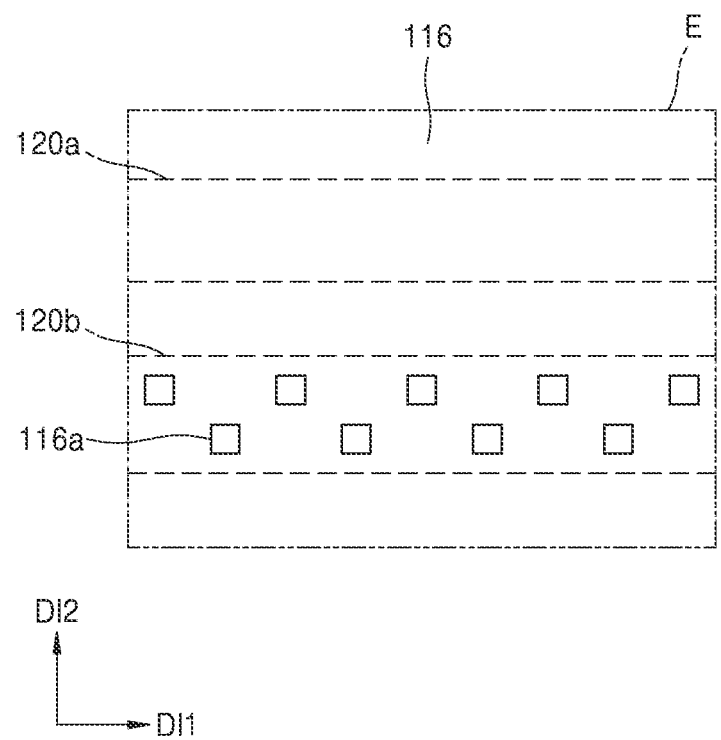
FIG. 17B is an enlarged plan view of a region E of FIG. 16.

FIG. 16 is an enlarged plan view of a region C of FIG. 15. FIG. 17A is an enlarged plan view of a region D of FIG. 16. FIG. 17B is an enlarged plan view of a region E of FIG. 16.

Referring to FIGS. 16 to 17B, the common voltage supply line 40 may include the first through hole 116a in a portion thereof that overlaps the second partition wall 120b. In this case, at least one first through hole 116a may be provided. The configuration and the number of first through holes 116a may be the same as or similar to those described with reference to FIGS. 3 to 5C.

The common voltage supply line 40 may be divided into a region (e.g., a region D of FIG. 17B or 16) in which at least one touch line TL crosses and a region (e.g., a region E of FIG. 17C or 16) in which the touch line TL is not arranged to cross. In this case, touch line TL may not be arranged on the common voltage supply line 40 in which the touch line TL is not arranged to cross.

The plurality of first through holes 116a may be arranged to have a preset pattern with a constant interval in the two regions.

The region D and the region E shown in FIG. 16 may be arranged also on the driving voltage supply line 30. As an example, though not shown in the drawing, similar to the region D in FIG. 16, the touch line TL may be arranged in a region F in FIG. 16. In another embodiment, similar to the region E in FIG. 16, the touch line TL may not be arranged in the region F in FIG. 16. In another embodiment, the touch line TL may be arranged in a portion of the region F in FIG. 16, and the touch line TL may not be arranged in another portion of the region F in FIG. 16. In another embodiment, the touch line TL may be arranged in the region F in FIG. 16, and the touch line TL may not be arranged in a portion of the driving voltage supply line 30 excluding the region F in FIG. 16. In another embodiment, the touch line TL may not be arranged in the region F in FIG. 16, and the touch line TL may be arranged in a portion of the driving voltage supply line 30 excluding the region F in FIG. 16.

Hereinafter, for convenience of description, the case where the touch line TL passes through the region F in FIG. 16 is mainly described in detail.

Figure 17C:
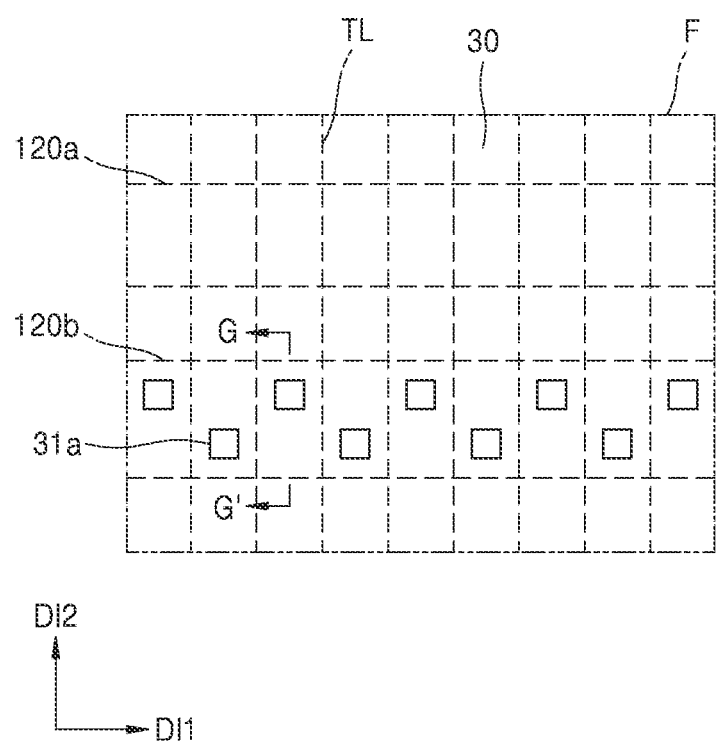
FIG. 17C is an enlarged plan view of a region F of FIG. 16.
Figure 17D:
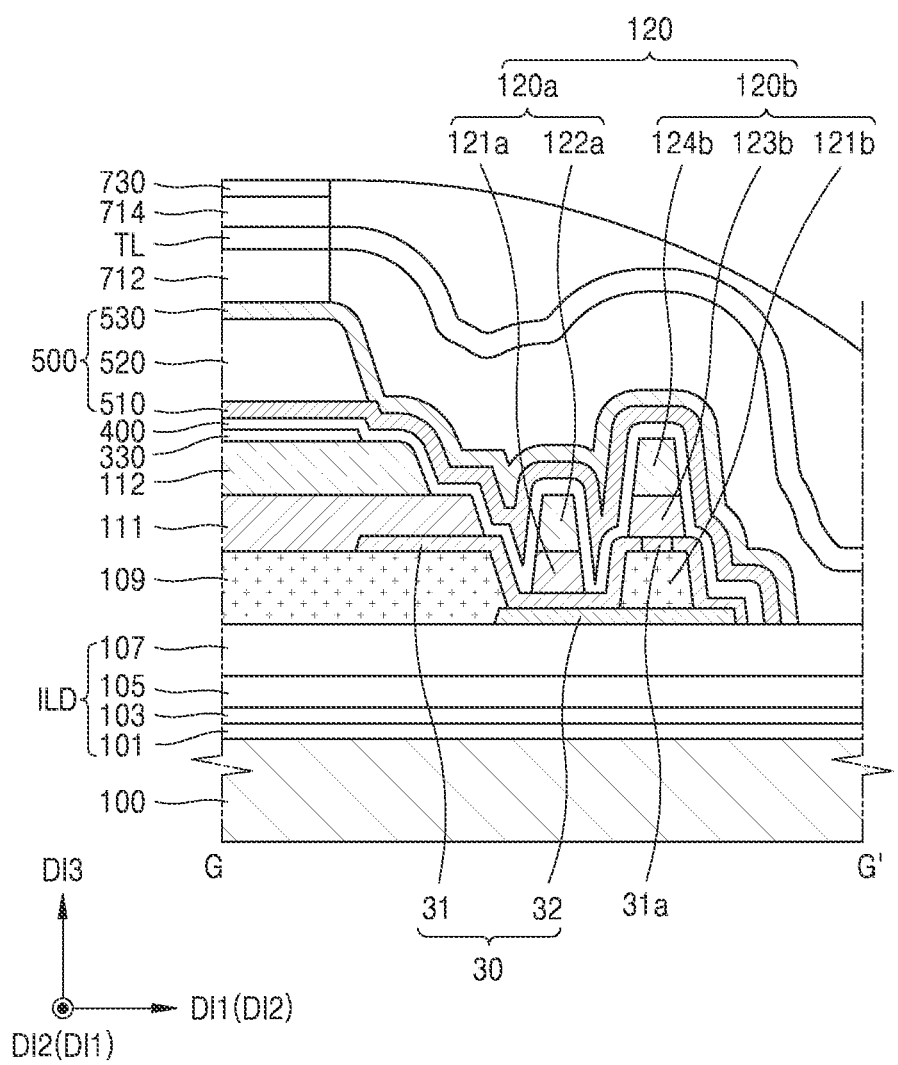
FIG. 17D is a cross-sectional view of a display apparatus, taken along line G-G' of FIG. 17C.

FIG. 17C is an enlarged plan view of the region F of FIG. 16. FIG. 17D is a cross-sectional view of a display apparatus, taken along line G-G' of FIG. 17C.

Referring to FIGS. 17C and 17D, similar to the common voltage supply line 40, the driving voltage supply line 30 may include a first driving voltage supply line 31 and a second driving voltage supply line 32. In this case, the second driving voltage supply line 32 and the first driving voltage supply line 31 may be arranged on different layers and connected to each other. That is, the second driving voltage supply line 32 may be arranged on the inorganic insulating layer ILD, and the first driving voltage supply line 31 may be arranged on the first planarization layer 109 and electrically connected to the second driving voltage supply line 32, the inorganic insulating layer ILD including at least one of the barrier layer (not shown), the buffer layer 101, the first gate insulating layer 103, the second gate insulating layer 105, and the interlayer insulating layer 107. In this case, the first driving voltage supply line 31 may be connected to the second driving voltage supply line 32 through a separate contact hole formed in the first planarization layer 109, or as shown in FIG. 17D, a portion of the second driving voltage supply line 32 exposed at the end of the first planarization layer 109 may meet and be connected to a portion of the first driving voltage supply line 31 exposed at the end of the first planarization layer 109.

Instead of being arranged on the first planarization layer 109, the first driving voltage supply line 31 may be arranged on the second planarization layer 111.

In this case, the second driving voltage supply line 32 and the first driving voltage supply line 31 may be arranged below the first partition wall 120a. In addition, the second driving voltage supply line 32 may be arranged below the second partition wall 120b and the first driving voltage supply line 31 may be arranged on the first layer 121b of the second partition wall 120b to pass through the second partition wall 120b. In this case, a second through hole 31a may be arranged in the first driving voltage supply line 31. The second through hole 31a may be the same as or similar to the first through hole 116a described above.

In this case, a gas occurring from the first layer 121b of the second partition wall 120b due to heat applied while the partition wall 120 is formed may be discharged to the outside through the second through hole 31a.

Particularly, in this case, even when the touch line TL is formed on the second partition wall 120b, the second partition wall 120b may be prevented from being swollen and rising too high and the touch line TL may be prevented from being disconnected.

Figure 18:
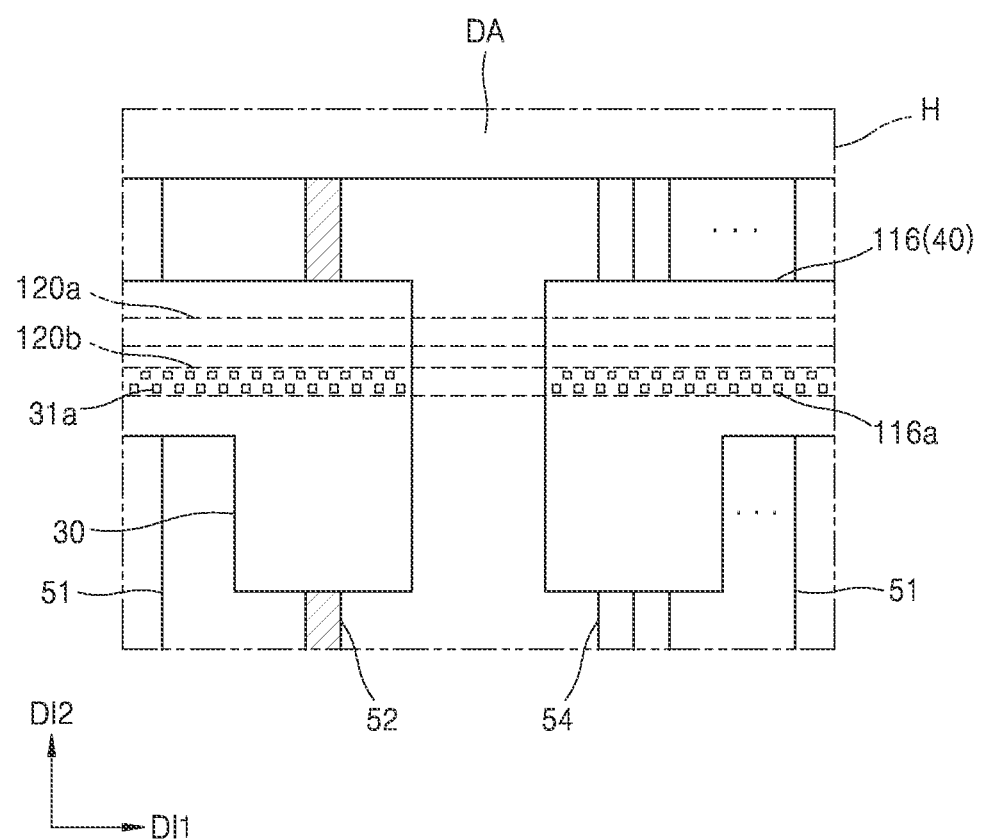
FIG. 18 is an enlarged plan view of a region H of FIG. 15.

FIG. 18 is an enlarged plan view of a region H of FIG. 15.

Referring to FIG. 18, the common voltage supply line 40 and the driving voltage supply line 30 may be arranged on the central portion of the substrate (not shown). In this case, the first through hole 116a and the second through hole 31a may be respectively formed in the common voltage supply line 40 and the driving voltage supply line 30. In this case, the first through hole 116a and the second through hole 31a may have the same size and the same configuration.

The display apparatus according to the embodiments may prevent or reduce disconnection of the touch line. The display apparatus according to the embodiments may prevent the shape of the partition wall from being transformed while the partition wall is formed. The display apparatus according to the embodiments may accurately detect a user's touch signal inputs.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A display apparatus comprising:
a substrate including a display area and a peripheral area;
a partition wall arranged in the peripheral area;
a first wiring arranged over the substrate, extending from the display area to the peripheral area, and inserted into the partition wall and passing through the partition wall; and
a second wiring arranged between the substrate and the first wiring,
wherein the first wiring includes at least one through hole,
the partition wall includes a first partition wall and a second partition wall,
the first partition wall is arranged between the display area and the second partition wall,
the first wiring passes through the second partition wall, and
the first wiring is in direct contact with the second wiring below the first partition wall from a first side of the first partition wall adjacent to the display area to a second side of the first partition wall adjacent to the second partition wall.

2. The display apparatus of claim 1, wherein the first wiring includes a plurality of through holes, and
the plurality of through holes are spaced apart from each other in one direction.

3. The display apparatus of claim 1, wherein the at least one through hole is arranged in the first wiring arranged inside the second partition wall when viewed in a plan view.

4. The display apparatus of claim 1, wherein the first wiring includes a plurality of through holes, and
the plurality of through holes are arranged in a serpentine pattern.

5. The display apparatus of claim 1, wherein the second partition wall includes:
a first layer arranged under the first wiring; and
a second layer arranged on the first wiring.

6. The display apparatus of claim 5, wherein the second partition wall further includes a third layer on the second layer.

7. The display apparatus of claim 6, wherein the second layer or the third layer includes a black material.

8. The display apparatus of claim 6, wherein the second partition wall further includes a fourth layer on the third layer.

9. The display apparatus of claim 5, wherein the first layer and the second layer each include an organic material.

10. The display apparatus of claim 1, wherein the partition wall surrounds an outside of the display area.

11. A display apparatus comprising:
a substrate including a display area and a peripheral area;
a partition wall arranged in the peripheral area;

a first wiring arranged over the substrate, extending from the display area to the peripheral area, and inserted into the partition wall and passing through the partition wall;

a second wiring arranged between the substrate and the first wiring; and a touch wiring arranged over the substrate, extending from the display area to the peripheral area, and arranged on the partition wall, wherein the first wiring includes at least one through hole, the partition wall includes a first partition wall and a second partition wall, the first partition wall is arranged between the display area and the second partition wall, the first wiring passes through the second partition wall, and the first wiring is in direct contact with the second wiring below the first partition wall from a first side of the first partition wall adjacent to the display area to a second side of the first partition wall adjacent to the second partition wall.

12. The display apparatus of claim 11, wherein the first wiring includes a plurality of through holes, and the plurality of through holes are spaced apart from each other in a lengthwise direction of the first wiring.

13. The display apparatus of claim 11, wherein the at least one through hole is arranged in the first wiring arranged inside the second partition wall, when viewed in a plan view.

14. The display apparatus of claim 11, wherein the first wiring includes a plurality of through holes, and the plurality of through holes are arranged in a serpentine pattern.

15. The display apparatus of claim 11, wherein the second partition wall includes:

a first layer arranged under the first wiring; and a second layer arranged on the first wiring.

16. The display apparatus of claim 15, wherein the first layer and the second layer each include an organic material.

17. The display apparatus of claim 15, wherein the second partition wall further includes a third layer on the second layer.

18. The display apparatus of claim 17, wherein the second layer or the third layer includes a black material.

19. The display apparatus of claim 11, wherein the partition wall surrounds an outside of the display area.

20. The display apparatus of claim 19, further comprising a terminal portion arranged in the peripheral area and configured to be connected to the first wiring and the touch wiring.

21. The display apparatus of claim 20, wherein the partition wall is arranged in a region between the terminal portion and the display area.

22. A display apparatus comprising:

a substrate including a display area and a peripheral area;

a partition wall arranged in the peripheral area;

a first wiring arranged over the substrate, extending from the display area to the peripheral area, and inserted into the partition wall and passing through the partition wall;

a second wiring arranged between the substrate and the first wiring; and a terminal portion arranged in the peripheral area, arranged apart from the display area, and configured to be connected to the wiring, wherein the partition wall is arranged between the terminal portion and the display area, and the first wiring includes at least one through hole, the partition wall includes a first partition wall and a second partition wall, the first partition wall is arranged between the display area and the second partition wall, the first wiring passes through the second partition wall, and the first wiring is in direct contact with the second wiring below the first partition wall from a first side of the first partition wall adjacent to the display area to a second side of the first partition wall adjacent to the second partition wall.

23. The display apparatus of claim 22, wherein the at least one through hole is arranged in the first wiring arranged inside the second partition wall when viewed in a plan view.

24. The display apparatus of claim 22, wherein the first wiring includes a plurality of through holes, and the plurality of through holes are arranged in a serpentine shape.

25. The display apparatus of claim 22, wherein the partition wall surrounds an outside of the display area.

* * * * *